US008651934B2

(12) United States Patent
Parrott et al.

(10) Patent No.: US 8,651,934 B2
(45) Date of Patent: Feb. 18, 2014

(54) GAMING MACHINE WITH SCANNING CAPABILITY

(75) Inventors: Gregory Parrott, Reno, NV (US); Franco Crivelli, Reno, NV (US)

(73) Assignee: IGT, Reno, NV (US)

( * ) Notice: Subject to any disclaimer, the term of this patent is extended or adjusted under 35 U.S.C. 154(b) by 1365 days.

(21) Appl. No.: 10/943,181

(22) Filed: Sep. 16, 2004

(65) Prior Publication Data

US 2005/0054417 A1 Mar. 10, 2005

Related U.S. Application Data

(63) Continuation-in-part of application No. 10/423,178, filed on Apr. 25, 2003, now Pat. No. 7,182,692.

(51) Int. Cl.
*A63F 9/24* (2006.01)
*A63F 13/00* (2006.01)
*G06F 17/00* (2006.01)
*G06F 19/00* (2011.01)

(52) U.S. Cl.
USPC .................. 463/16; 463/25; 463/29; 463/30; 463/42; 463/47

(58) Field of Classification Search
USPC .............................. 463/16, 25, 29, 30, 42, 47
See application file for complete search history.

(56) References Cited

U.S. PATENT DOCUMENTS 3,848,228 A 11/1974 MacNeill
4,194,685 A 3/1980 Hill et al.
4,555,617 A 11/1985 Brooks et al.
4,695,171 A 9/1987 Sapitowicz
4,724,307 A 2/1988 Dutton et al.
4,958,379 A 9/1990 Yamaguchi et al.
5,216,595 A 6/1993 Protheroe
5,239,165 A 8/1993 Novak
5,247,166 A 9/1993 Cannon et al.
5,273,281 A 12/1993 Lovell
5,326,104 A * 7/1994 Pease et al. ..................... 463/18
5,417,424 A 5/1995 Snowden et al.

(Continued)

FOREIGN PATENT DOCUMENTS

AU 2004235124 10/2008
EP 1618536 1/2006

(Continued)

OTHER PUBLICATIONS

International Search Report for International Application No. PCT/US2004/010826 dated Aug. 31, 2004.

(Continued)

*Primary Examiner* — Adetokunbo O Torimiro
(74) *Attorney, Agent, or Firm* — Foley & Lardner LLP

(57) ABSTRACT

A gaming apparatus is provided that has a display unit capable of generating video images, an input device and a controller operatively coupled to the display unit and input device. The controller has a processor and a memory operatively coupled to the processor. A network interface may be operatively coupled to a network and to the controller. The controller may be programmed to allow the user to: play a game, access the network, view additional data on the display, input player data into the gaming unit, create a player card, input an event bet slip and select additional information on the event underlying the bet for viewing.

30 Claims, 20 Drawing Sheets

(56) References Cited

U.S. PATENT DOCUMENTS

| | | | | |
|---|---|---|---|---|
| 5,573,244 | A * | 11/1996 | Mindes | 463/26 |
| 5,682,819 | A | 11/1997 | Beaty | |
| 5,818,026 | A | 10/1998 | Melling et al. | |
| 6,142,876 | A | 11/2000 | Cumbers | |
| 6,176,429 | B1 | 1/2001 | Reddersen et al. | |
| 6,234,900 | B1 | 5/2001 | Cumbers | |
| 6,364,765 | B1 | 4/2002 | Walker et al. | |
| 6,505,778 | B1 | 1/2003 | Redersen et al. | |
| 6,582,301 | B2 | 6/2003 | Hill | |
| 6,800,029 | B2 * | 10/2004 | Rowe et al. | 463/25 |
| 7,112,138 | B2 * | 9/2006 | Hedrick et al. | 463/29 |
| 7,182,692 | B2 | 2/2007 | Parrott et al. | |
| 2001/0029487 | A1 | 10/2001 | Kwon | |
| 2001/0033689 | A1 | 10/2001 | Meder | |
| 2002/0094860 | A1 | 7/2002 | Itkis et al. | |
| 2002/0119817 | A1 | 8/2002 | Behm et al. | |
| 2002/0142816 | A1 | 10/2002 | Stronach | |
| 2002/0160832 | A1 | 10/2002 | Burns et al. | |
| 2002/0169509 | A1 | 11/2002 | Huang et al. | |
| 2003/0027635 | A1 * | 2/2003 | Walker et al. | 463/40 |
| 2003/0032474 | A1 * | 2/2003 | Kaminkow | 463/25 |
| 2003/0114217 | A1 * | 6/2003 | Walker et al. | 463/20 |
| 2004/0009812 | A1 * | 1/2004 | Scott et al. | 463/28 |
| 2004/0059445 | A1 * | 3/2004 | Moore et al. | 700/91 |
| 2004/0214643 | A1 | 10/2004 | Parrott et al. | |
| 2004/0229671 | A1 | 11/2004 | Stronach et al. | |
| 2004/0235542 | A1 | 11/2004 | Stronach et al. | |
| 2005/0054417 | A1 | 3/2005 | Parrott et al. | |
| 2006/0019741 | A1 * | 1/2006 | Tobin | 463/25 |
| 2006/0189371 | A1 * | 8/2006 | Walker et al. | 463/16 |
| 2007/0111780 | A1 | 5/2007 | Parrott et al. | |
| 2007/0178970 | A1 * | 8/2007 | LeMay et al. | 463/42 |

FOREIGN PATENT DOCUMENTS

| | | |
|---|---|---|
| WO | WO-93/03454 | 2/1993 |
| WO | WO-02/30534 | 4/2002 |
| WO | WO-02/30534 A1 | 4/2002 |
| WO | WO-03/046852 | 6/2003 |
| WO | WO-03/046852 A2 | 6/2003 |

OTHER PUBLICATIONS

Written Opinion for International Application No. PCT/US2004/010826 dated Aug. 31, 2004.
Office Action dated Jun. 16, 2006 from U.S. Appl. No. 10/423,178.
Notice of Allowance dated Oct. 11, 2006 from U.S. Appl. No. 10/423,178.
Summons to Attend Oral Proceedings dated Mar. 9, 2009 for European Application No. 04760244.6.
Decision to Refuse a European Patent Application dated Jun. 29, 2009 for European Application No. 04760244.6.
Statement of Grounds and Particulars dated Jan. 23, 2009 in Australian Patent Application No. 2004235124.
Office Action dated Apr. 6, 2009 from U.S. Appl. No. 11/619,373.
Final Office Action dated Nov. 18, 2009 from U.S. Appl. No. 11/619,373.
Australian Office Action dated Jun. 28, 2007, from Application No. 2004235124.
European Office Action dated Jul. 12, 2006, from Application No. 04760244.6.

* cited by examiner

GAMING MACHINE WITH SCANNING CAPABILITY

CROSS REFERENCE TO RELATED APPLICATION

This application is a continuation-in-part application claiming priority from U.S. application Ser. No. 10/423,178, filed Apr. 25, 2003, entitled "Gaming Machine with Scanning Capability" and incorporated herein by reference in its entirety.

BACKGROUND

This patent application pertains generally to gaming equipment such as that found at casinos and more particularly, to new methods which casino patrons may use to interact with gaming apparatus for purposes of playing games conducted by the gaming apparatus, playing games conducted over a network connection and, for accessing casino services.

Present day casinos offer a large variety of games as well as customer services. In addition, casinos offer services and attractions to entice a wide spectrum of people to visit casinos including shows, concerts, circuses, shopping, aquariums, roller coasters, spas, sports, sporting events, restaurants, clubs and bars to name a few. To attend many of these attractions, reservations may be necessary. Making reservations may be a cumbersome task, such as requiring a patron to visit multiple locations in or outside the casino or requiring a patron to make numerous telephone calls to different numbers.

Betting on casino-wide games such as Bingo, Keno, and sports book also can be cumbersome and require a patron to visit several locations within a casino. These games typically involve multiple patrons at a casino, each betting on the same event. For example, hundreds of casino patrons may choose to bet on the outcome of the 'Super Bowl' or on the outcome of the 'house' Keno game run by the casino. To participate, patrons write on a coupon the outcome they predict will occur and the amount they are willing to bet. They then must submit the coupon to a casino attendant responsible for posting the patron's bet promptly or they must do so themselves, prior to the start of the event on which the patron has placed a bet. Attendants are also responsible for issuing receipts and manually paying the patrons who win their bets.

SUMMARY

According to one aspect of the disclosure, a gaming apparatus may have a display unit that is capable of generating video images, an input device and a controller operatively coupled to the display unit and the input device, where the controller may have a processor and a memory operatively coupled to said processor. A network interface may be operatively coupled to a network and to the controller. The controller may be programmed to allow a user or player to play a game. The controller also may be programmed to allow a user to access the network and view on the display unit additional data where the data may be information in addition to information related to the game and the gaming unit. Such additional information may be information obtained from the Internet, from an email interface or from another network.

According to another aspect, the user may be able to input player data into the gaming unit. The player data may be stored in the memory. The user may be able to create a player card based on the player data inputted.

Accordingly to yet another aspect, the controller may be programmed to allow a user to input an event bet slip. The user may be able to select to view additional information on the event underlying the bet. Such additional information may include seeing key plays in the event, the end of the event, statistics from the event or reports from the event. In addition, the user may be able to place additional bets on other events using the credits on the gaming unit. Additional aspects of the invention are defined by the claims of this patent.

DETAILED DESCRIPTION OF VARIOUS EMBODIMENTS

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '__________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
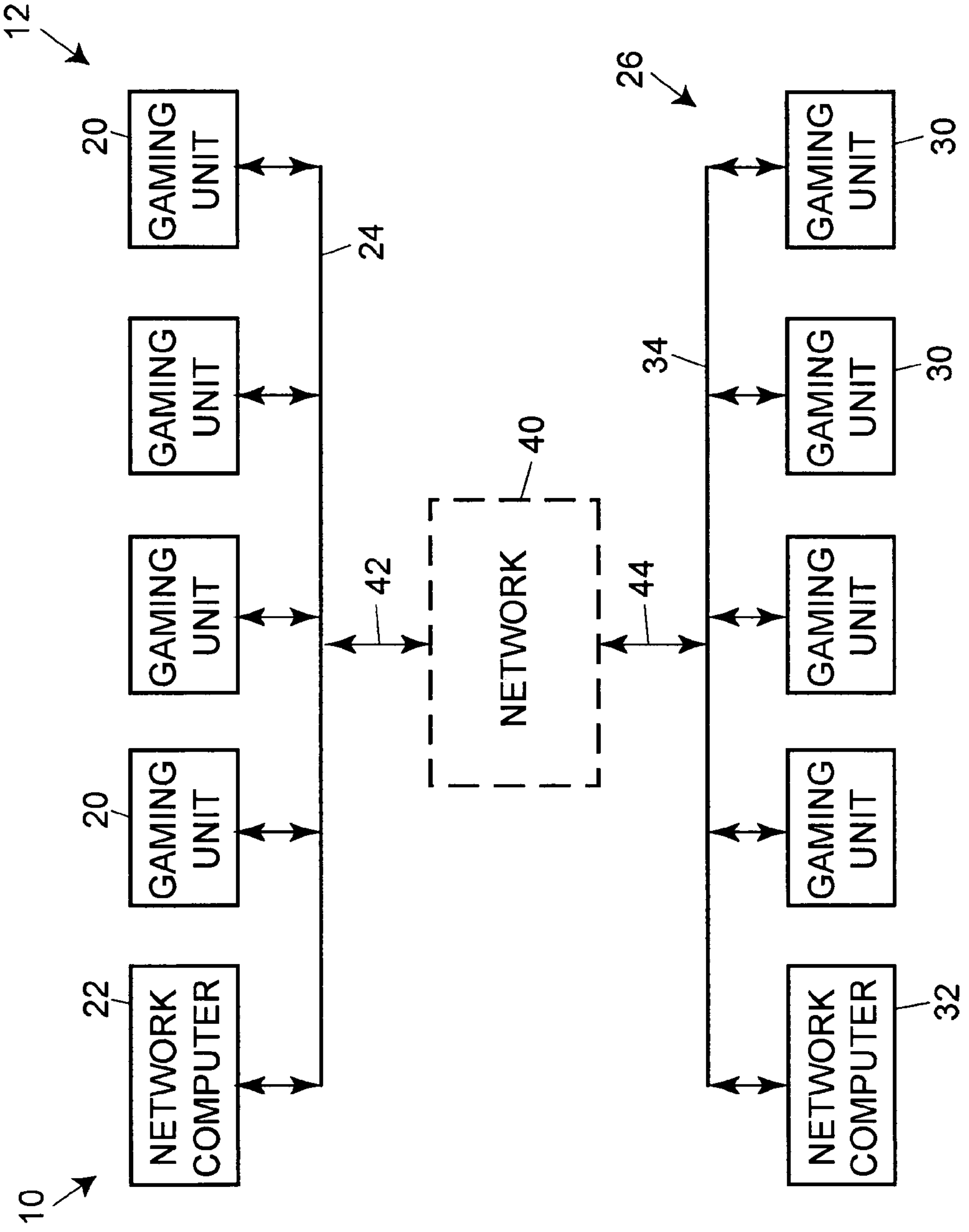
FIG. 1 is a block diagram of an embodiment of a gaming system in accordance with the invention.

FIG. 1 illustrates one possible embodiment of a casino gaming system 10 in accordance with the invention. Referring to FIG. 1, the casino gaming system 10 may include a first group or network 12 of casino gaming units 20 operatively coupled to a network computer 22 via a network data link or bus 24. The casino gaming system 10 may include a second group or network 26 of casino gaming units 30 operatively coupled to a network computer 32 via a network data link or bus 34. The first and second gaming networks 12, 26 may be operatively coupled to each other via a network 40, which may comprise, for example, the Internet, a wide area network (WAN), or a local area network (LAN) via a first network link 42 and a second network link 44.

The first network 12 of gaming units 20 may be provided in a first casino, and the second network 26 of gaming units 30 may be provided in a second casino located in a separate geographic location than the first casino. For example, the two casinos may be located in different areas of the same city, or they may be located in different states. The network 40 may include a plurality of network computers or server computers (not shown), each of which may be operatively interconnected. Where the network 40 comprises the Internet, data communication may take place over the communication links 42, 44 via an Internet communication protocol.

The network computer 22 may be a server computer and may be used to accumulate and analyze data relating to the operation of the gaming units 20. For example, the network computer 22 may continuously receive data from each of the gaming units 20 indicative of the dollar amount and number of wagers being made on each of the gaming units 20, data indicative of how much each of the gaming units 20 is paying out in winnings, data regarding the identity and gaming habits of users or players playing each of the gaming units 20, etc. The network computer 32 may be a server computer and may be used to perform the same or different functions in relation to the gaming units 30 as the network computer 22 described above.

Although each network 12, 26 is shown to include one network computer 22, 32 and four gaming units 20, 30, it should be understood that different numbers of computers and gaming units may be utilized. For example, the network 12 may include a plurality of network computers 22 and tens or hundreds of gaming units 20, all of which may be interconnected via the data link 24. The data link 24 may provided as a dedicated hardwired link or a wireless link. Although the data link 24 is shown as a single data link 24, the data link 24 may comprise multiple data links.

Figure 2:
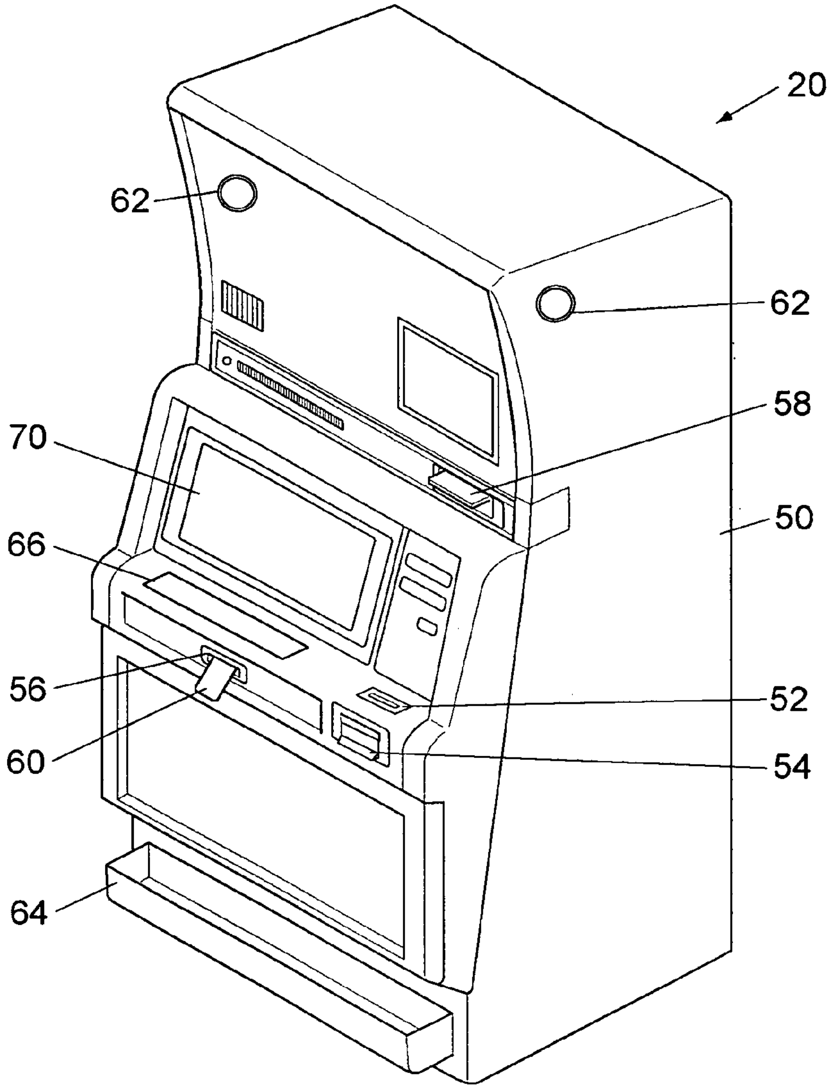
FIG. 2 is a perspective view of an embodiment of one of the gaming units shown schematically in FIG. 1.

FIG. 2 is a perspective view of one possible embodiment of one or more of the gaming units 20. Although the following description addresses the design of the gaming units 20, it should be understood that the gaming units 30 may have the same design as the gaming units 20 described below. It should be understood that the design of one or more of the gaming units 20 may be different than the design of other gaming units 20, and that the design of one or more of the gaming units 30 may be different than the design of other gaming units 30. Each gaming unit 20 may be any type of casino gaming unit and may have various different structures and methods of operation. For exemplary purposes, various designs of the gaming units 20 are described below, but it should be understood that numerous other designs may be utilized.

Referring to FIG. 2, the casino gaming unit 20 may include a housing or cabinet 50 and one or more input devices, which may include a coin slot or acceptor 52, a paper currency acceptor 54, a ticket reader/printer 56 and a card reader 58, which may be used to input value to the gaming unit 20. A value input device may include any device that can accept value from a customer. As used herein, the term "value" may encompass gaming tokens, coins, paper currency, ticket vouchers, credit or debit cards, smart cards, and any other object representative of value.

If provided on the gaming unit 20, the ticket reader/printer 56 may be used to read and/or print or otherwise encode ticket vouchers 60. The ticket vouchers 60 may be composed of paper or another printable or encodable material and may have one or more of the following informational items printed or encoded thereon: the casino name, the type of ticket voucher, a validation number, a bar code with control and/or security data labeled user check-boxes, labeled user write-in boxes, the date and time of issuance of the ticket voucher, redemption instructions and restrictions, a description of an award, and any other information that may be necessary or desirable. Different types of ticket vouchers 60 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 60 could be printed with an optically readable material such as ink, or data on the ticket vouchers 60 could be magnetically encoded. The ticket reader/printer 56 may be provided with the ability to both read and print ticket vouchers 60, or it may be provided with the ability to only read or only print or encode ticket vouchers 60. In the latter case, for example, some of the gaming units 20 may have ticket printers 56 that may be used to print ticket vouchers 60, which could then be used by a user in other gaming units 20 that have ticket readers 56.

If provided, the card reader 58 may include any type of card reading device, such as a magnetic card reader or an optical card reader, and may be used to read data from a card offered by a user, such as a credit card or a player tracking card. If provided for player tracking purposes, the card reader 58 may be used to read data from, and/or write data to, player tracking cards that are capable of storing data representing the identity of a user, the identity of a casino, the user's gaming habits, etc.

The gaming unit 20 may include one or more audio speakers 62, a coin payout tray 64, an input control panel 66, and a color video display unit 70 for displaying images relating to the game or games provided by the gaming unit 20. The audio speakers 62 may generate audio representing sounds such as the noise of spinning slot machine reels, a dealer's voice, music, announcements or any other audio related to a casino game. The input control panel 66 may be provided with a plurality of pushbuttons or touch-sensitive areas that may be pressed by a user to select games, make wagers, make gaming decisions, etc.

Figure 2A:
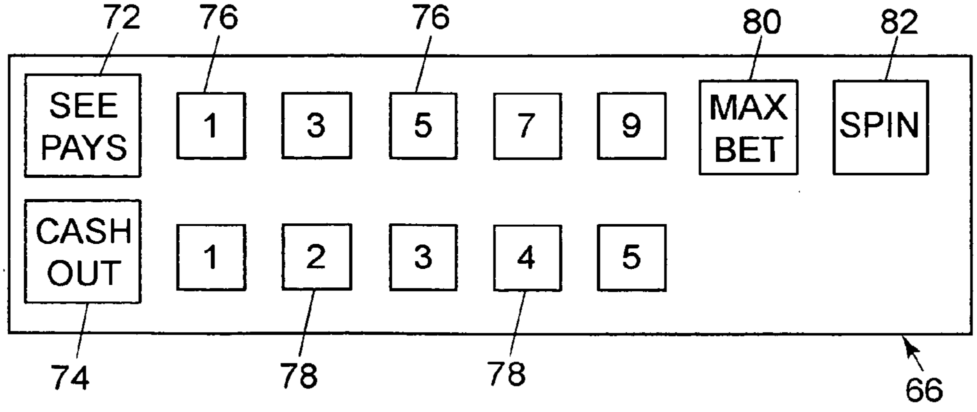
FIG. 2A illustrates an embodiment of a control panel for a gaming unit.

FIG. 2A illustrates one possible embodiment of the control panel 66, which may be used where the gaming unit 20 is a slot machine having a plurality of mechanical or "virtual" reels. Referring to FIG. 2A, the control panel 66 may include a "See Pays" button 72 that, when activated, causes the display unit 70 to generate one or more display screens showing the odds or payout information for the game or games provided by the gaming unit 20. As used herein, the term "button" is intended to encompass any device that allows a user to make an input, such as an input device that must be depressed to make an input selection or a display area that a user may simply touch. The control panel 66 may include a "Cash Out" button 74 that may be activated when a user decides to terminate play on the gaming unit 20, in which case the gaming unit 20 may return value to the user, such as by returning a number of coins to the user via the payout tray 64.

If the gaming unit 20 provides a slots game having a plurality of reels and a plurality of paylines which define winning combinations of reel symbols, the control panel 66 may be provided with a plurality of selection buttons 76, each of which allows the user to select a different number of paylines prior to spinning the reels. For example, five buttons 76 may be provided, each of which may allow a user to select one, three, five, seven or nine paylines.

If the gaming unit 20 provides a slots game having a plurality of reels, the control panel 66 may be provided with a plurality of selection buttons 78 each of which allows a user to specify a wager amount for each payline selected. For example, if the smallest wager accepted by the gaming unit 20 is a quarter ($0.25), the gaming unit 20 may be provided with five selection buttons 78, each of which may allow a user to select one, two, three, four or five quarters to wager for each payline selected. In that case, if a user were to activate the "5" button 76 (meaning that five paylines were to be played on the next spin of the reels) and then activate the "3" button 78 (meaning that three coins per payline were to be wagered), the total wager would be $3.75 (assuming the minimum bet was $0.25).

The control panel 66 may include a "Max Bet" button 80 to allow a user to make the maximum wager allowable for a game. In the above example, where up to nine paylines were provided and up to five quarters could be wagered for each payline selected, the maximum wager would be 45 quarters, or $11.25. The control panel 66 may include a spin button 82 to allow the user to initiate spinning of the reels of a slots game after a wager has been made.

In FIG. 2A, a rectangle is shown around the buttons 72, 74, 76, 78, 80, 82. It should be understood that that rectangle simply designates, for ease of reference, an area in which the buttons 72, 74, 76, 78, 80, 82 may be located. Consequently, the term "control panel" should not be construed to imply that a panel or plate separate from the housing 50 of the gaming unit 20 is required, and the term "control panel" may encompass a plurality or grouping of user activatable buttons.

Although one possible control panel 66 is described above, it should be understood that different buttons could be utilized in the control panel 66, and that the particular buttons used may depend on the game or games that could be played on the gaming unit 20. Although the control panel 66 is shown to be separate from the display unit 70, it should be understood that the control panel 66 could be generated by the display unit 70. In that case, each of the buttons of the control panel 66 could be a colored area generated by the display unit 70, and some type of mechanism may be associated with the display unit 70 to detect when each of the buttons was touched, such as a touch-sensitive screen.

Gaming Unit Electronics

Figure 3:
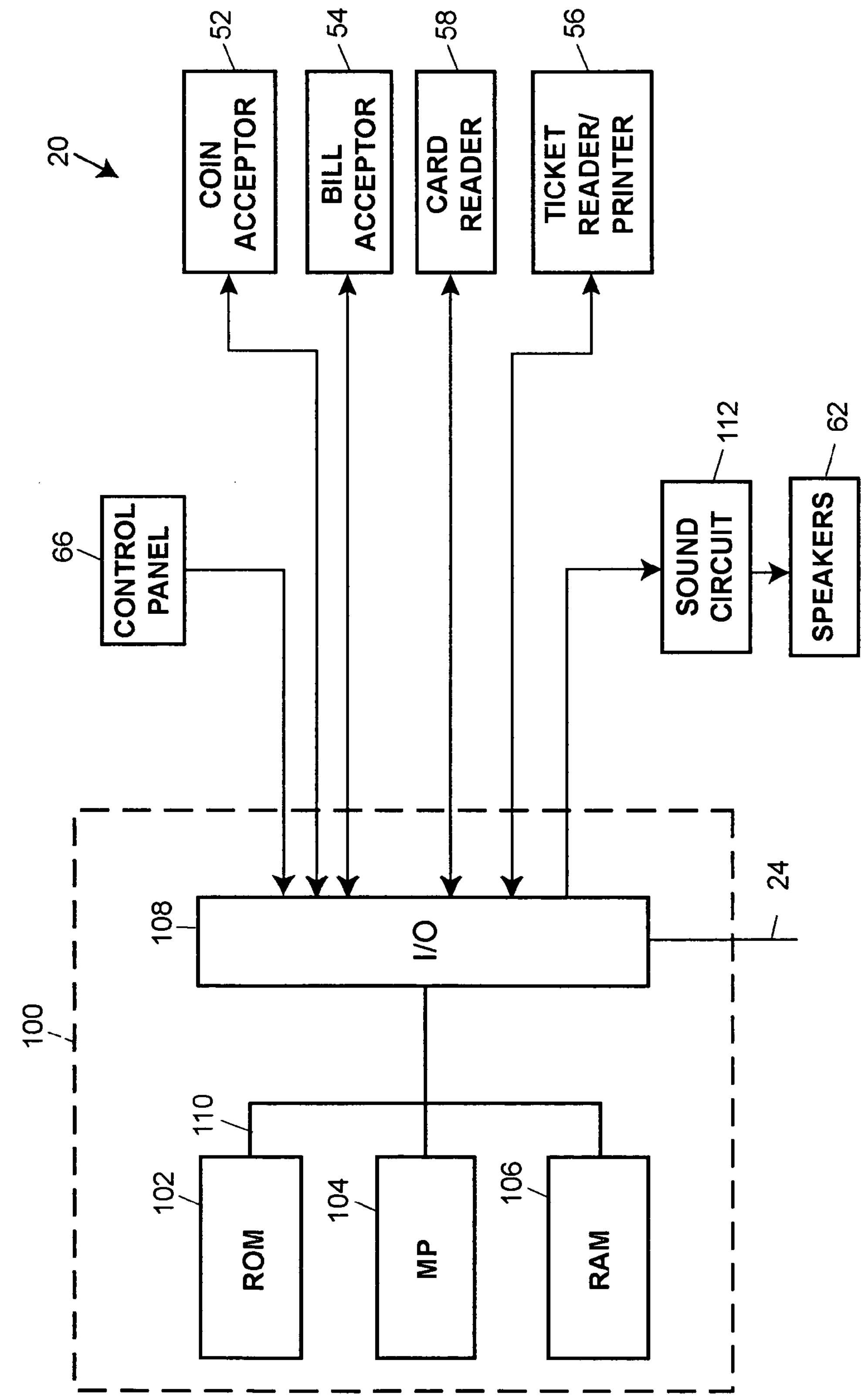
FIG. 3 is a block diagram of the electronic components of the gaming unit of FIG. 2.

FIG. 3 is a block diagram of a number of components that may be incorporated in the gaming unit 20. Referring to FIG. 3, the gaming unit 20 may include a controller 100 that may comprise a program memory 102, a microcontroller or microprocessor (MP) 104, a random-access memory (RAM) 106 and an input/output (I/O) circuit 108, all of which may be interconnected via an address/data bus 110. It should be appreciated that although only one microprocessor 104 is shown, the controller 100 may include multiple microprocessors 104. Similarly, the memory of the controller 100 may include multiple RAMs 106 and multiple program memories 102. Although the I/O circuit 108 is shown as a single block, it should be appreciated that the I/O circuit 108 may include a number of different types of I/O circuits. The RAM(s) 104 and program memories 102 may be implemented as semiconductor memories, magnetically readable memories, and/or optically readable memories, for example.

Although the program memory 102 is shown in FIG. 3 as a read-only memory (ROM) 102, the program memory of the controller 100 may be a read/write or alterable memory, such as a hard disk. In the event a hard disk is used as a program memory, the address/data bus 110 shown schematically in FIG. 3 may comprise multiple address/data buses, which may be of different types, and there may be an I/O circuit disposed between the address/data buses.

FIG. 3 illustrates that the control panel 66, the coin acceptor 52, the bill acceptor 54, the card reader 58 and the ticket reader/printer 56 may be operatively coupled to the I/O circuit 108, each of those components being so coupled by either a unidirectional or bidirectional, single-line or multiple-line data link, which may depend on the design of the component that is used. The speaker(s) 62 may be operatively coupled to a sound circuit 112, that may comprise a voice- and sound-synthesis circuit or that may comprise a driver circuit. The sound-generating circuit 112 may be coupled to the I/O circuit 108.

As shown in FIG. 3, the components 52, 54, 56, 58, 66, 112 may be connected to the I/O circuit 108 via a respective direct line or conductor. Different connection schemes could be used. For example, one or more of the components shown in FIG. 3 may be connected to the I/O circuit 108 via a common bus or other data link that is shared by a number of components. Furthermore, some of the components may be directly connected to the microprocessor 104 without passing through the I/O circuit 108.

Overall Operation of Gaming Unit

One manner in which one or more of the gaming units 20 (and one or more of the gaming units 30) may operate is described below in connection with a number of flowcharts which represent a number of portions or routines of one or more computer programs, which may be stored in one or more of the memories of the controller 100. The computer program(s) or portions thereof may be stored remotely, outside of the gaming unit 20, and may control the operation of the gaming unit 20 from a remote location. Such remote control may be facilitated with the use of a wireless connection, or by an Internet interface that connects the gaming unit 20 with a remote computer (such as one of the network computers 22, 32) having a memory in which the computer program portions are stored. The computer program portions may be written in any high level language such as C, C++, C#, Java or the like or any low-level assembly or machine language. By storing the computer program portions therein, various portions of the memories 102, 106 are physically and/or structurally configured in accordance with computer program instructions.

Figure 4:
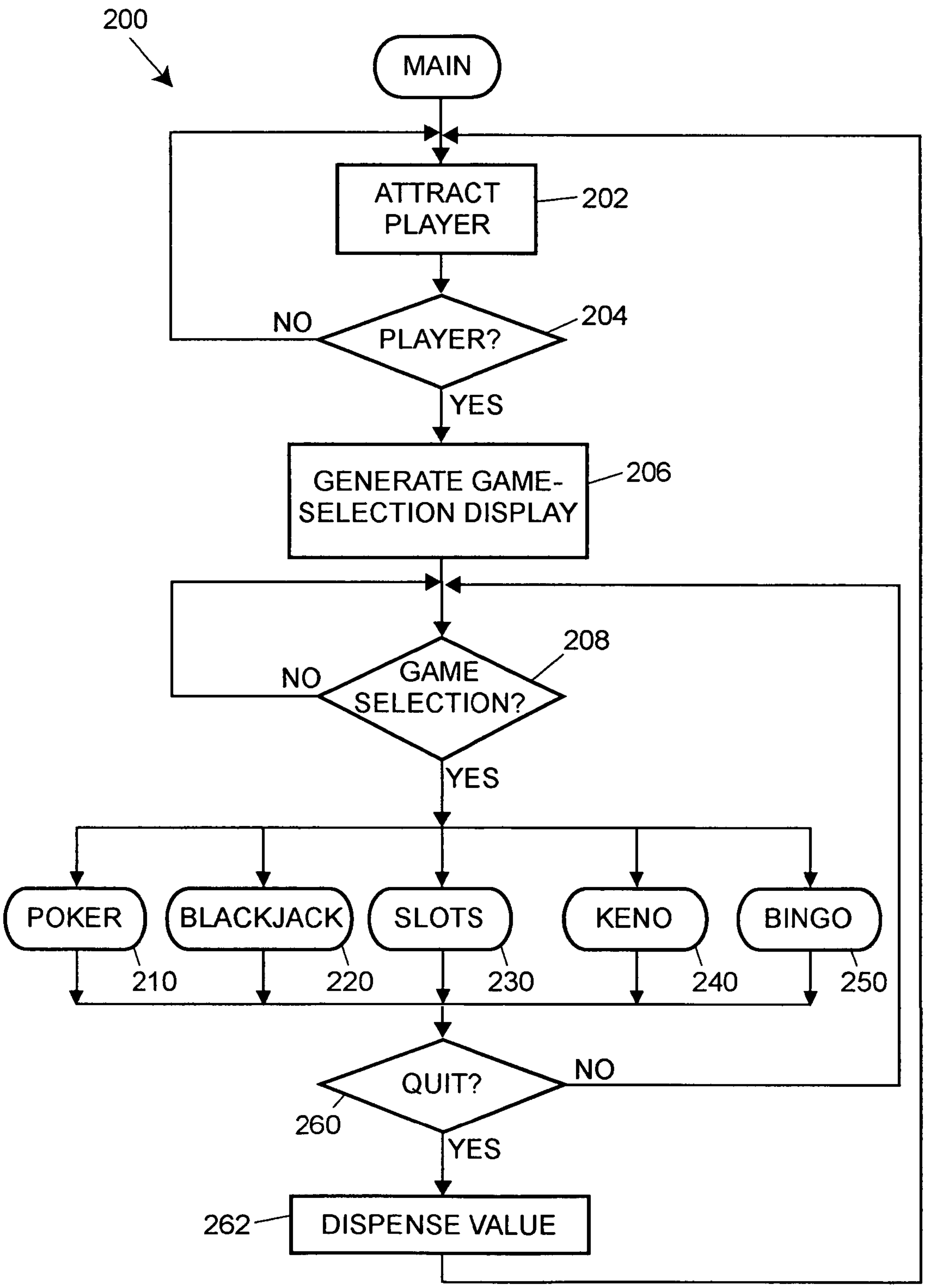
FIG. 4 is a flowchart of an embodiment of a main routine that may be performed during operation of one or more of the gaming units.

FIG. 4 is a flowchart of a main operating routine 200 that may be stored in the memory of the controller 100. Referring to FIG. 4, the main routine 200 may begin operation at block 202 during which an attraction sequence may be performed in an attempt to induce a potential user in a casino to play the gaming unit 20. The attraction sequence may be performed by displaying one or more video images on the display unit 70 and/or causing one or more sound segments, such as voice or music, to be generated via the speakers 62. The attraction sequence may include a scrolling list of games that may be played on the gaming unit 20 and/or video images of various games being played, such as video poker, video blackjack, video slots, video keno, video bingo, etc.

During performance of the attraction sequence, if a potential user makes any input to the gaming unit 20 as determined at block 204, the attraction sequence may be terminated and a game-selection display may be generated on the display unit 70 at block 206 to allow the user to select a game available on the gaming unit 20. The gaming unit 20 may detect an input at block 204 in various ways. For example, the gaming unit 20 could detect if the user presses any button on the gaming unit 20; the gaming unit 20 could determine if the user deposited one or more coins into the gaming unit 20; the gaming unit 20 could determine if user deposited paper currency into the gaming unit; etc.

The game-selection display generated at block 206 may include, for example, a list of video games that may be played on the gaming unit 20 and/or a visual message to prompt the user to deposit value into the gaming unit 20. While the game-selection display is generated, the gaming unit 20 may wait for the user to make a game selection. Upon selection of one of the games by the user as determined at block 208, the controller 100 may cause one of a number of game routines to be performed to allow the selected game to be played. For example, the game routines could include a video poker routine 210, a video blackjack routine 220, a slots routine 230, a video keno routine 240, and a video bingo routine 250. At block 208, if no game selection is made within a given period of time, the operation may branch back to block 202.

After one of the routines 210, 220, 230, 240, 250 has been performed to allow the user to play one of the games, block 260 may be utilized to determine whether the user wishes to terminate play on the gaming unit 20 or to select another game. If the user wishes to stop playing the gaming unit 20, which wish may be expressed, for example, by selecting a “Cash Out” button, the controller 100 may dispense value to the user at block 262 based on the outcome of the game(s) played by the user. The operation may then return to block 202. If the user did not wish to quit as determined at block 260, the routine may return to block 208 where the game-selection display may again be generated to allow the user to select another game.

It should be noted that although five gaming routines are shown in FIG. 4, a different number of routines could be included to allow play of a different number of games. The gaming unit 20 may also be programmed to allow play of different games.

Figure 5:
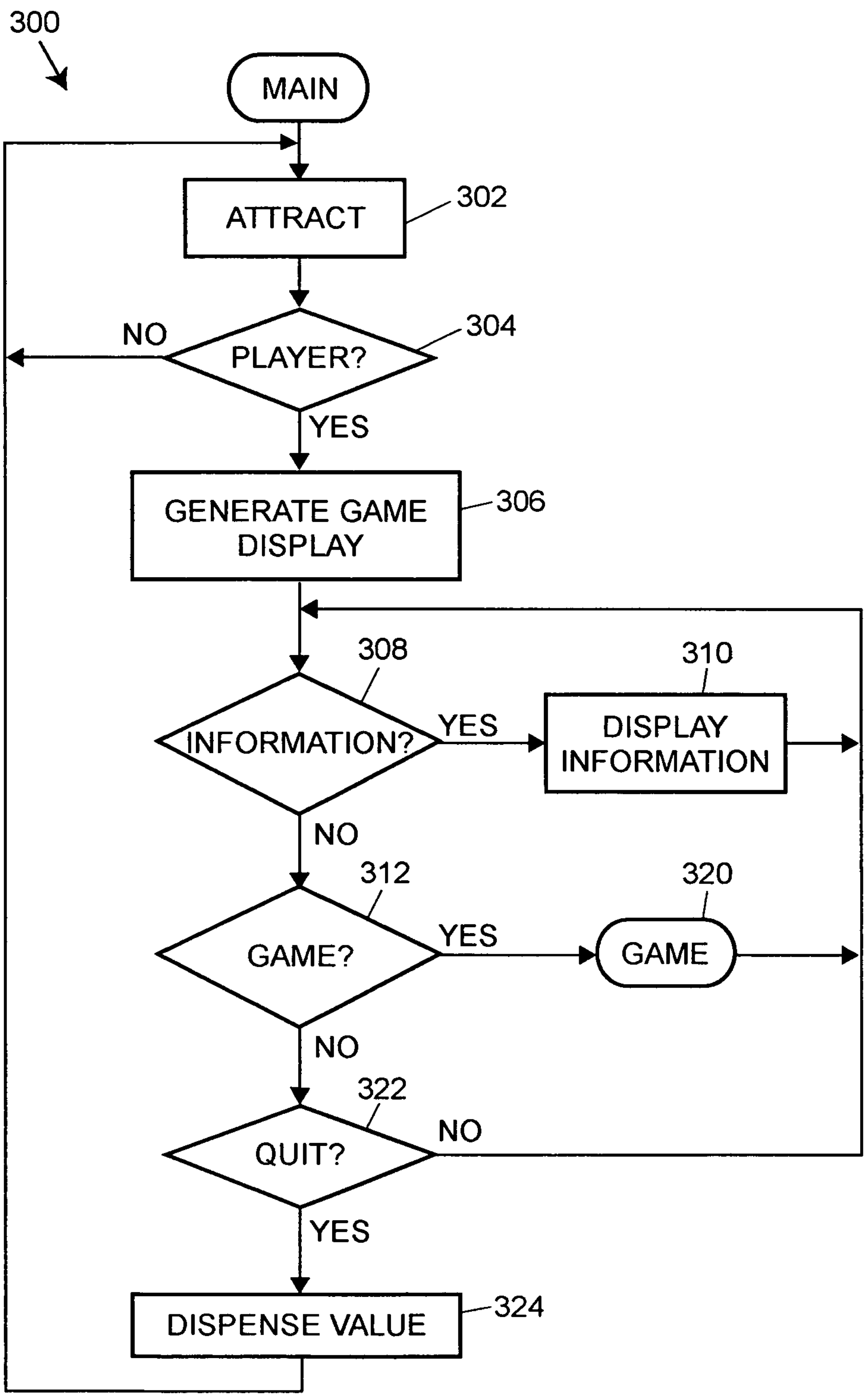
FIG. 5 is a flowchart of an alternative embodiment of a main routine that may be performed during operation of one or more of the gaming units.

FIG. 5 is a flowchart of an alternative main operating routine 300 that may be stored in the memory of the controller 100. The main routine 300 may be utilized for gaming units 20 that are designed to allow play of only a single game or single type of game. Referring to FIG. 5, the main routine 300 may begin operation at block 302 during which an attraction sequence may be performed in an attempt to induce a potential user in a casino to play the gaming unit 20. The attraction sequence may be performed by displaying one or more video images on the display unit 70 and/or causing one or more sound segments, such as voice or music, to be generated via the speakers 62.

During performance of the attraction sequence, if a potential user makes any input to the gaming unit 20 as determined at block 304, the attraction sequence may be terminated and a game display may be generated on the display unit 70 at block 306. The game display generated at block 306 may include, for example, an image of the casino game that may be played on the gaming unit 20 and/or a visual message to prompt the user to deposit value into the gaming unit 20. At block 308, the gaming unit 20 may determine if the user requested information concerning the game, in which case the requested information may be displayed at block 310. Block 312 may be used to determine if the user requested initiation of a game, in which case a game routine 320 may be performed. The game routine 320 could be any one of the game routines disclosed herein, such as one of the five game routines 210, 220, 230, 240, 250, or another game routine.

After the routine 320 has been performed to allow the user to play the game, block 322 may be utilized to determine whether the user wishes to terminate play on the gaming unit 20. If the user wishes to stop playing the gaming unit 20, which wish may be expressed, for example, by selecting a “Cash Out” button, the controller 100 may dispense value to the user at block 324 based on the outcome of the game(s) played by the user. The operation may then return to block 302. If the user did not wish to quit as determined at block 322, the operation may return to block 308.

Video Poker

Figure 6:
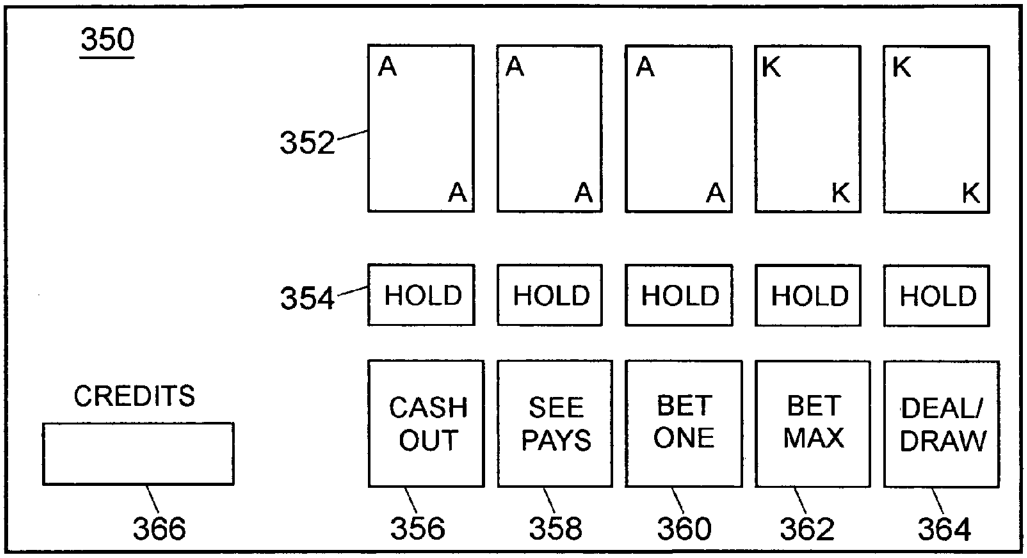
FIG. 6 is an illustration of an embodiment of a visual display that may be displayed during performance of the video poker routine of FIG. 8.

FIG. 6 is an exemplary display 350 that may be shown on the display unit 70 during performance of the video poker routine 210 shown schematically in FIG. 4. Referring to FIG. 6, the display 350 may include video images 352 of a plurality of playing cards representing the user's hand, such as five cards. To allow the user to control the play of the video poker game, a plurality of user-selectable buttons may be displayed. The buttons may include a "Hold" button 354 disposed directly below each of the playing card images 352, a "Cash Out" button 356, a "See Pays" button 358, a "Bet One Credit" button 360, a "Bet Max Credits" button 362, and a "Deal/Draw" button 364. Alternatively, users may input their selections using the scanner 650. This enables the user to prepare their selections at the users convenience without having to wait for a game to start or for a gaming unit 20 to be available. The display 350 may also include an area 366 in which the number of remaining credits or value is displayed. If the display unit 70 is provided with a touch-sensitive screen, the buttons 354, 356, 358, 360, 362, 364 may form part of the video display 350. Alternatively, one or more of those buttons may be provided as part of a control panel that is provided separately from the display unit 70.

Figure 8:
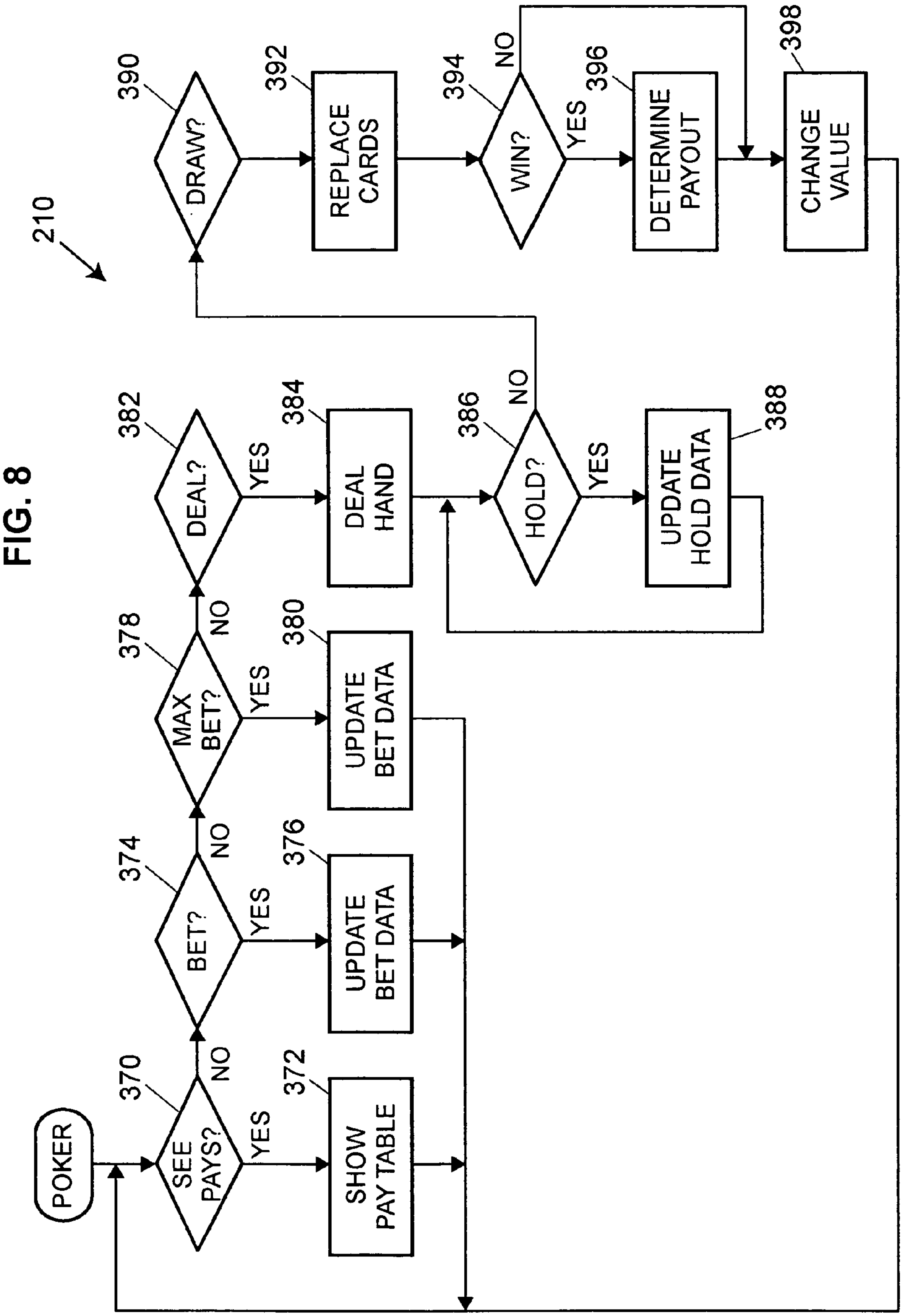
FIG. 8 is a flowchart of an embodiment of a video poker routine that may be performed by one or more of the gaming units.

FIG. 8 is a flowchart of the video poker routine 210 shown schematically in FIG. 4. Referring to FIG. 8, at block 370, the routine may determine whether the user has requested payout information, such as by activating the "See Pays" button 358, in which case at block 372 the routine may cause one or more pay tables to be displayed on the display unit 70. At block 374, the routine may determine whether the user has made a bet, such as by pressing the "Bet One Credit" button 360, in which case at block 376 bet data corresponding to the bet made by the user may be stored in the memory of the controller 100. At block 378, the routine may determine whether the user has pressed the "Bet Max Credits" button 362, in which case at block 380 bet data corresponding to the maximum allowable bet may be stored in the memory of the controller 100.

At block 382, the routine may determine if the user desires a new hand to be dealt, which may be determined by detecting if the "Deal/Draw" button 364 was activated after a wager was made. In that case, at block 384 a video poker hand may be "dealt" by causing the display unit 70 to generate the playing card images 352. After the hand is dealt, at block 386 the routine may determine if any of the "Hold" buttons 354 have been activated by the user, in which case data regarding which of the playing card images 352 are to be "held" may be stored in the controller 100 at block 388. If the "Deal/Draw" button 364 is activated again as determined at block 390, each of the playing card images 352 that was not "held" may be caused to disappear from the video display 350 and to be replaced by a new, randomly selected, playing card image 352 at block 392.

At block 394, the routine may determine whether the poker hand represented by the playing card images 352 currently displayed is a winner. That determination may be made by comparing data representing the currently displayed poker hand with data representing all possible winning hands, which may be stored in the memory of the controller 100. If there is a winning hand, a payout value corresponding to the winning hand may be determined at block 396. At block 398, the user's cumulative value or number of credits may be updated by subtracting the bet made by the user and adding, if the hand was a winner, the payout value determined at block 396. The cumulative value or number of credits may also be displayed in the display area 366 (FIG. 6).

Although the video poker routine 210 is described above in connection with a single poker hand of five cards, the routine 210 may be modified to allow other versions of poker to be played. For example, seven card poker may be played, or stud poker may be played. Alternatively, multiple poker hands may be simultaneously played. In that case, the game may begin by dealing a single poker hand, and the user may be allowed to hold certain cards. After deciding which cards to hold, the held cards may be duplicated in a plurality of different poker hands, with the remaining cards for each of those poker hands being randomly determined.

Video Blackjack

Figure 7:
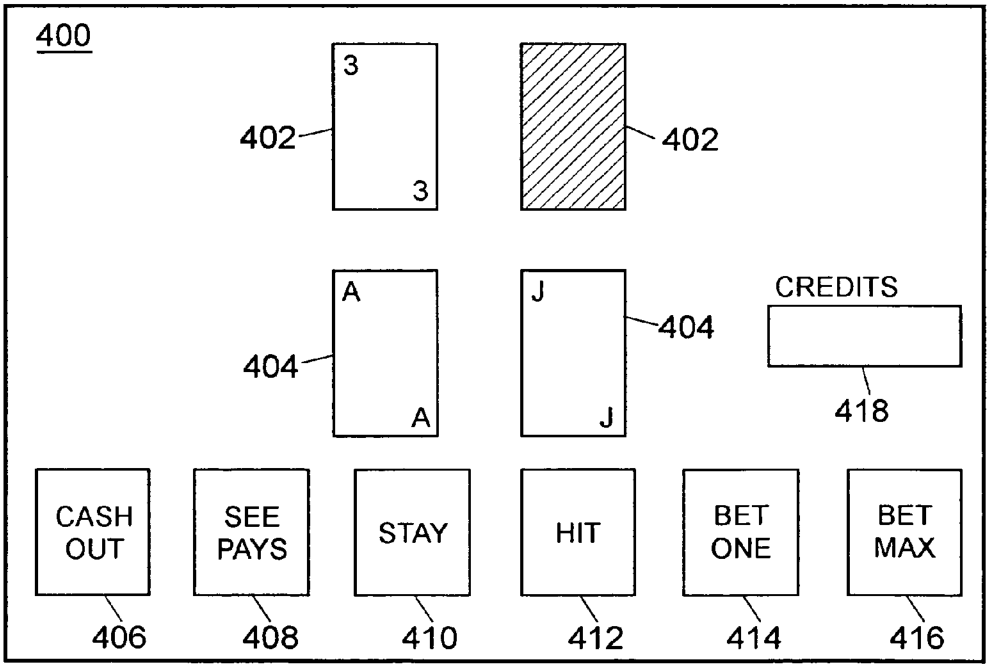
FIG. 7 is an illustration of an embodiment of a visual display that may be displayed during performance of the video blackjack routine of FIG. 9.

FIG. 7 is an exemplary display 400 that may be shown on the display unit 70 during performance of the video blackjack routine 220 shown schematically in FIG. 4. Referring to FIG. 7, the display 400 may include video images 402 of a pair of playing cards representing a dealer's hand, with one of the cards shown face up and the other card being shown face down, and video images 404 of a pair of playing cards representing a user's hand, with both the cards shown face up. The "dealer" may be the gaming unit 20.

To allow the user to control the play of the video blackjack game, a plurality of user-selectable buttons may be displayed. The buttons may include a "Cash Out" button 406, a "See Pays" button 408, a "Stay" button 410, a "Hit" button 412, a "Bet One Credit" button 414, and a "Bet Max Credits" button 416. Alternatively, users may input their selections using the scanner 650. This enables the user to prepare their selections at the users convenience without having to wait for a game to start or for a gaming unit 20 to be available. The display 400 may also include an area 418 in which the number of remaining credits or value is displayed. If the display unit 70 is provided with a touch-sensitive screen, the buttons 406, 408, 410, 412, 414, 416 may form part of the video display 400. Alternatively, one or more of those buttons may be provided as part of a control panel that is provided separately from the display unit 70.

Figure 9:
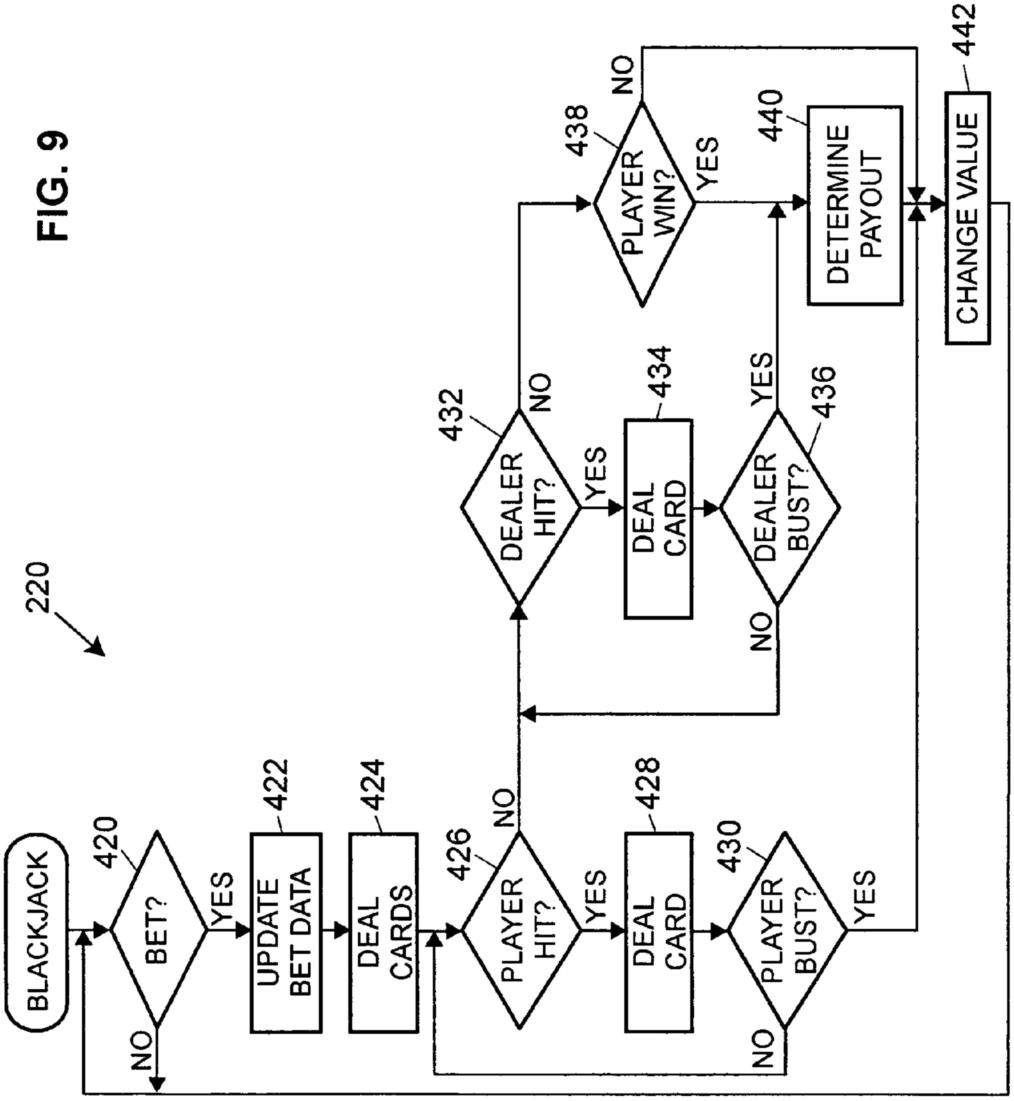
FIG. 9 is a flowchart of an embodiment of a video blackjack routine that may be performed by one or more of the gaming units.

FIG. 9 is a flowchart of the video blackjack routine 220 shown schematically in FIG. 4. Referring to FIG. 9, the video blackjack routine 220 may begin at block 420 where it may determine whether a bet has been made by the user. That may be determined, for example, by detecting the activation of either the "Bet One Credit" button 414 or the "Bet Max Credits" button 416. At block 422, bet data corresponding to the bet made at block 420 may be stored in the memory of the controller 100. At block 424, a dealer's hand and a user's hand may be "dealt" by making the playing card images 402, 404 appear on the display unit 70.

At block 426, the user may be allowed to be "hit," in which case at block 428 another card will be dealt to the user's hand by making another playing card image 404 appear in the display 400. If the user is hit, block 430 may determine if the user has "bust," or exceeded 21. If the user has not bust, blocks 426 and 428 may be performed again to allow the user to be hit again.

If the user decides not to hit, at block 432 the routine may determine whether the dealer should be hit. Whether the dealer hits may be determined in accordance with predetermined rules, such as the dealer always hit if the dealer's hand totals 15 or less. If the dealer hits, at block 434 the dealer's hand may be dealt another card by making another playing card image 402 appear in the display 400. At block 436 the routine may determine whether the dealer has bust. If the dealer has not bust, blocks 432, 434 may be performed again to allow the dealer to be hit again.

If the dealer does not hit, at block 436 the outcome of the blackjack game and a corresponding payout may be determined based on, for example, whether the user or the dealer has the higher hand that does not exceed 21. If the user has a winning hand, a payout value corresponding to the winning hand may be determined at block 440. At block 442, the user's cumulative value or number of credits may be updated by subtracting the bet made by the user and adding, if the user won, the payout value determined at block 440. The cumulative value or number of credits may also be displayed in the display area 418 (FIG. 7).

Slots

Figure 10:
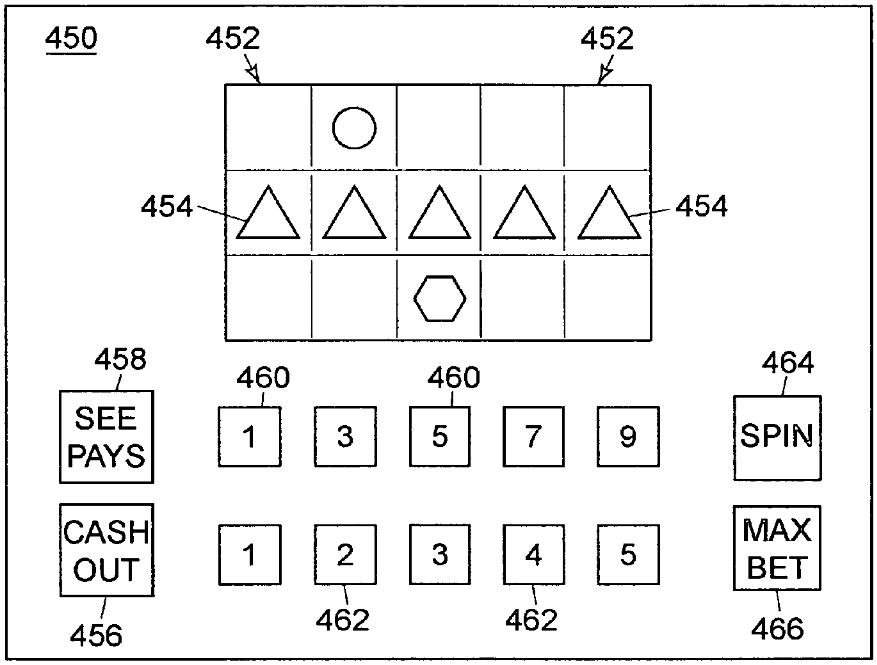
FIG. 10 is an illustration of an embodiment of a visual display that may be displayed during performance of the slots routine of FIG. 12.

FIG. 10 is an exemplary display 450 that may be shown on the display unit 70 during performance of the slots routine 230 shown schematically in FIG. 4. Referring to FIG. 10, the display 450 may include video images 452 of a plurality of slot machine reels, each of the reels having a plurality of reel symbols 454 associated therewith. Although the display 450 shows five reel images 452, each of which may have three reel symbols 454 that are visible at a time, other reel configurations could be utilized.

To allow the user to control the play of the slots game, a plurality of user-selectable buttons may be displayed. The buttons may include a "Cash Out" button 456, a "See Pays" button 458, a plurality of payline-selection buttons 460 each of which allows the user to select a different number of paylines prior to "spinning" the reels, a plurality of bet-selection buttons 462 each of which allows a user to specify a wager amount for each payline selected, a "Spin" button 464, and a "Max Bet" button 466 to allow a user to make the maximum wager allowable. Alternatively, users may input their selections using the scanner 650. This enables the user to prepare their selections at the users convenience without having to wait for a game to start or for a gaming unit 20 to be available.

Figure 12:
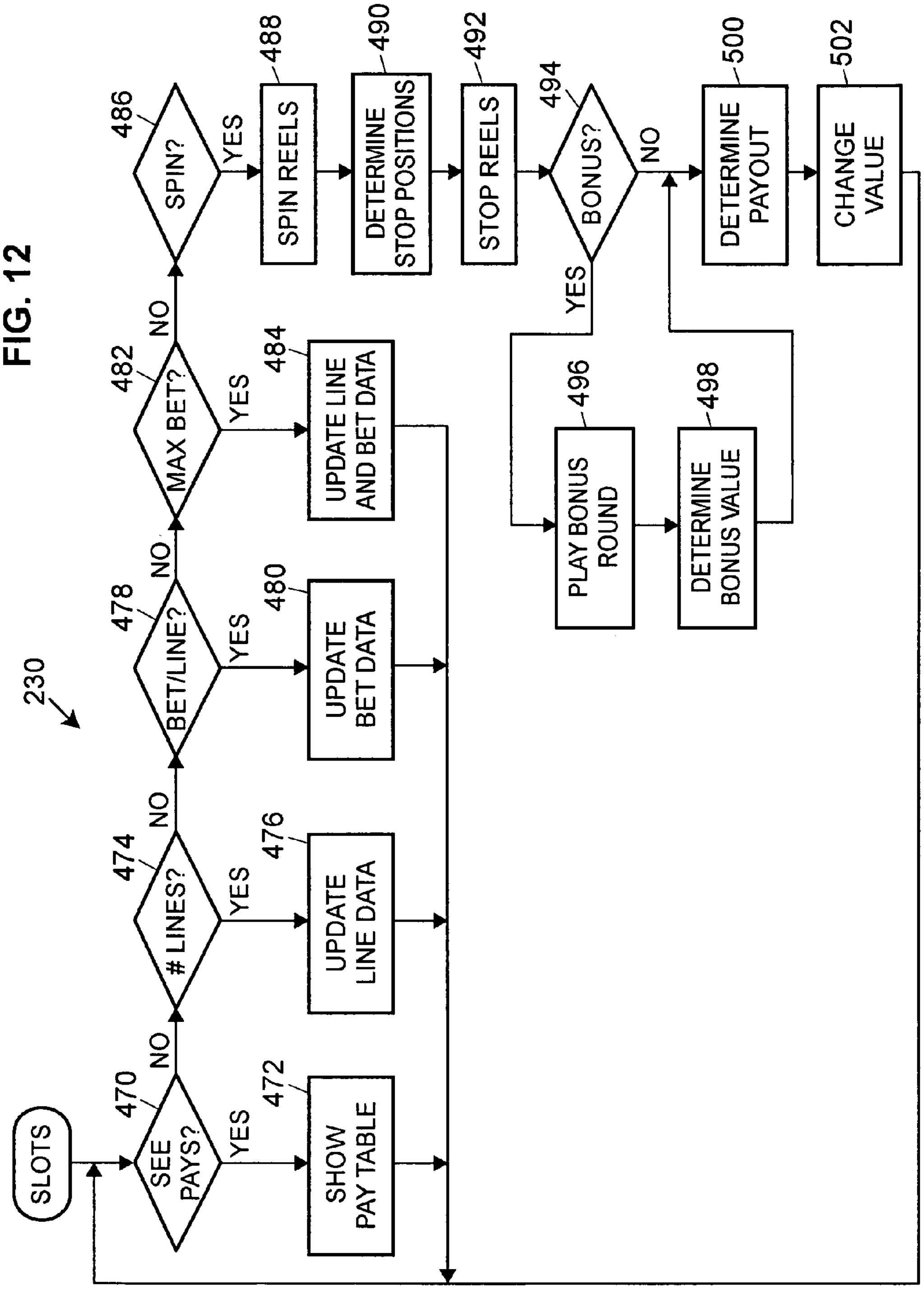
FIG. 12 is a flowchart of an embodiment of a slots routine that may be performed by one or more of the gaming units.

FIG. 12 is a flowchart of the slots routine 230 shown schematically in FIG. 10. Referring to FIG. 12, at block 470, the routine may determine whether the user has requested payout information, such as by activating the "See Pays" button 458, in which case at block 472 the routine may cause one or more pay tables to be displayed on the display unit 70. At block 474, the routine may determine whether the user has pressed one of the payline-selection buttons 460, in which case at block 476 data corresponding to the number of paylines selected by the user may be stored in the memory of the controller 100. At block 478, the routine may determine whether the user has pressed one of the bet-selection buttons 462, in which case at block 480 data corresponding to the amount bet per payline may be stored in the memory of the controller 100. At block 482, the routine may determine whether the user has pressed the "Max Bet" button 466, in which case at block 484 bet data (which may include both payline data and bet-per-payline data) corresponding to the maximum allowable bet may be stored in the memory of the controller 100.

If the "Spin" button 464 has been activated by the user as determined at block 486, at block 488 the routine may cause the slot machine reel images 452 to begin "spinning" so as to simulate the appearance of a plurality of spinning mechanical slot machine reels. At block 490, the routine may determine the positions at which the slot machine reel images will stop, or the particular symbol images 454 that will be displayed when the reel images 452 stop spinning. At block 492, the routine may stop the reel images 452 from spinning by displaying stationary reel images 452 and images of three symbols 454 for each stopped reel image 452. The virtual reels may be stopped from left to right, from the perspective of the user, or in any other manner or sequence.

The routine may provide for the possibility of a bonus game or round if certain conditions are met, such as the display in the stopped reel images 452 of a particular symbol 454. If there is such a bonus condition as determined at block 494, the routine may proceed to block 496 where a bonus round may be played. The bonus round may be a different game than slots, and many other types of bonus games could be provided. If the user wins the bonus round, or receives additional credits or points in the bonus round, a bonus value may be determined at block 498. A payout value corresponding to outcome of the slots game and/or the bonus round may be determined at block 500. At block 502, the user's cumulative value or number of credits may be updated by subtracting the bet made by the user and adding, if the slot game and/or bonus round was a winner, the payout value determined at block 500.

Although the above routine has been described as a virtual slot machine routine in which slot machine reels are represented as images on the display unit 70, actual slot machine reels that are capable of being spun may be utilized instead.

Video Keno

Figure 11:
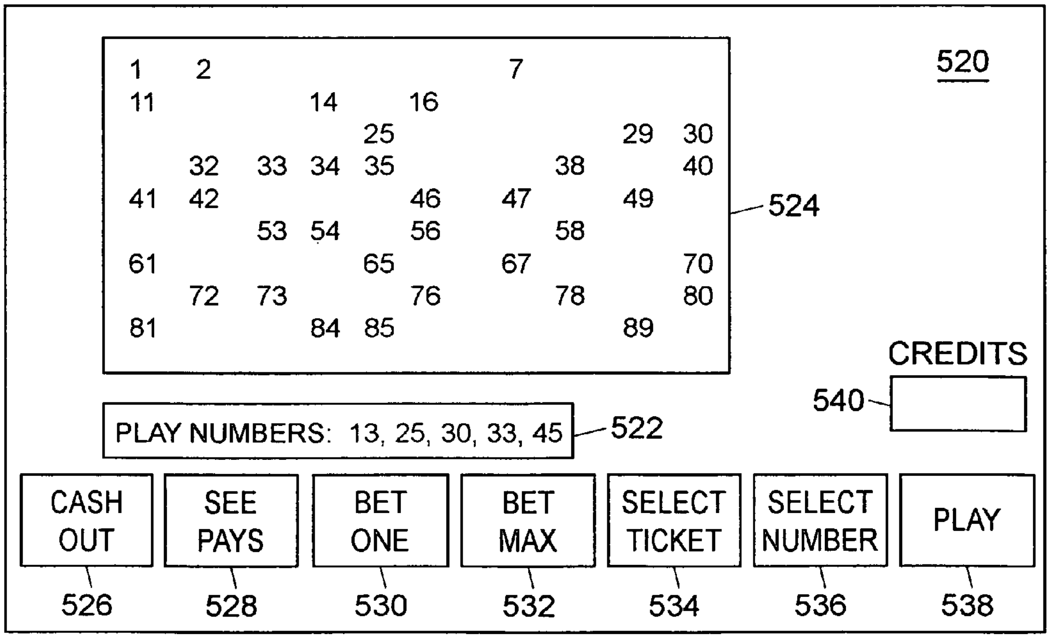
FIG. 11 is an illustration of an embodiment of a visual display that may be displayed during performance of the video keno routine of FIG. 13.

FIG. 11 is an exemplary display 520 that may be shown on the display unit 70 during performance of the video keno routine 240 shown schematically in FIG. 4. Referring to FIG. 11, the display 520 may include a video image 522 of a plurality of numbers that were selected by the user prior to the start of a keno game and a video image 524 of a plurality of numbers randomly selected during the keno game. The randomly selected numbers may be displayed in a grid pattern.

To allow the user to control the play of the keno game, a plurality of user-selectable buttons may be displayed. The buttons may include a "Cash Out" button 526, a "See Pays" button 528, a "Bet One Credit" button 530, a "Bet Max Credits" button 532, a "Select Ticket" button 534, a "Select Number" button 536, and a "Play" button 538. Alternatively, users may input their selections using the scanner 650. This enables the user to prepare their selections at the users convenience without having to wait for a game to start or for a gaming unit 20 to be available. The display 520 may also include an area 540 in which the number of remaining credits or value is displayed. If the display unit 70 is provided with a touch-sensitive screen, the buttons may form part of the video display 520. Alternatively, one or more of those buttons may be provided as part of a control panel that is provided separately from the display unit 70.

Figure 13:
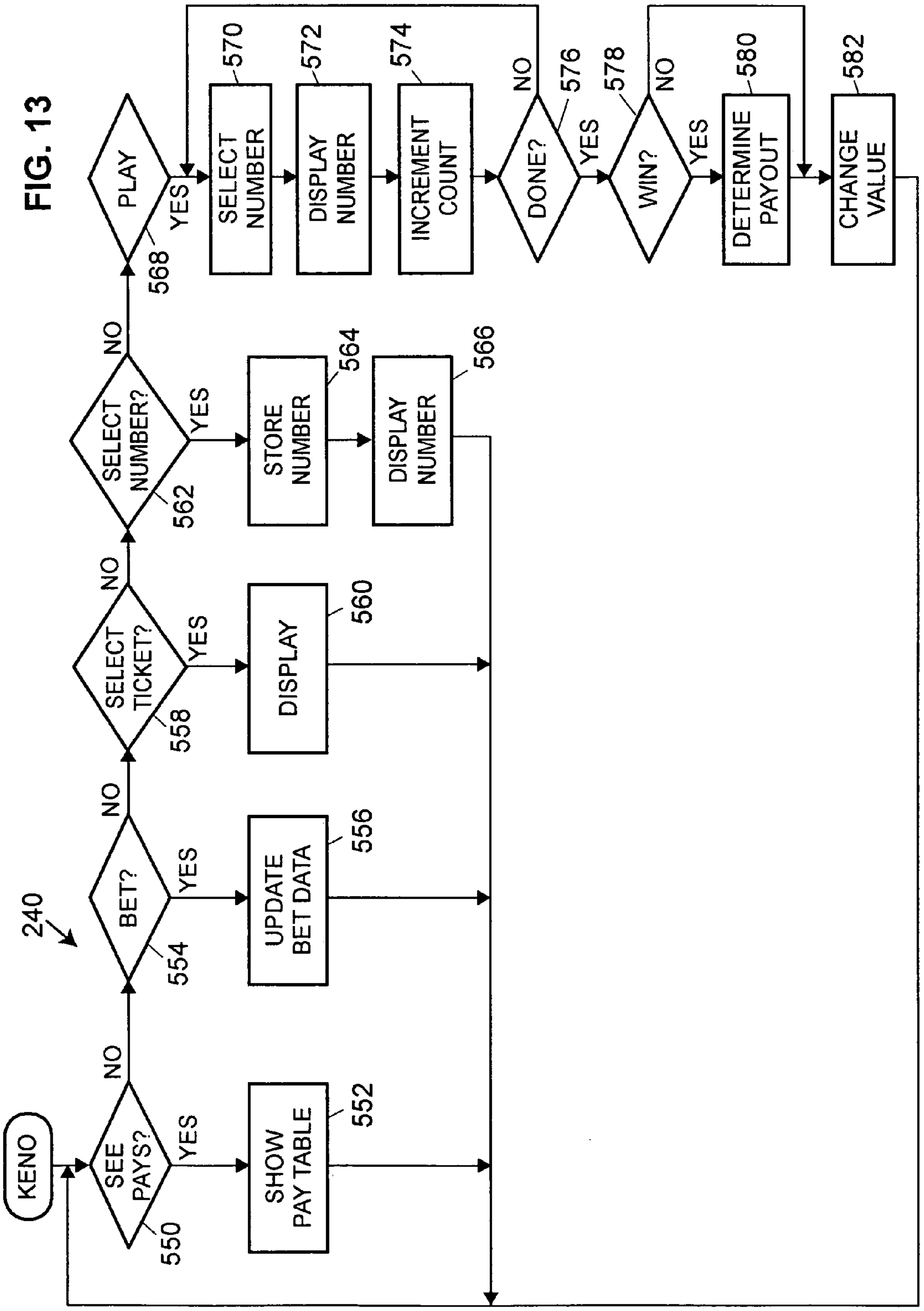
FIG. 13 is a flowchart of an embodiment of a video keno routine that may be performed by one or more of the gaming units.

FIG. 13 is a flowchart of the video keno routine 240 shown schematically in FIG. 4. The keno routine 240 may be utilized in connection with a single gaming unit 20 where a single user is playing a keno game, or the keno routine 240 may be utilized in connection with multiple gaming units 20 where multiple users are playing a single keno game. In the latter case, one or more of the acts described below may be performed either by the controller 100 in each gaming unit or by one of the network computer 22, 32 to which multiple gaming units 20 are operatively connected.

Referring to FIG. 13, at block 550, the routine may determine whether the user has requested payout information, such as by activating the "See Pays" button 528, in which case at block 552 the routine may cause one or more pay tables to be displayed on the display unit 70. At block 554, the routine may determine whether the user has made a bet, such as by having pressed the "Bet One Credit" button 530 or the "Bet Max Credits" button 532, in which case at block 556 bet data corresponding to the bet made by the user may be stored in the memory of the controller 100. After the user has made a wager, at block 558 the user may select a keno ticket, and at block 560 the ticket may be displayed on the display 520. At block 562, the user may select one or more game numbers, which may be within a range set by the casino. After being selected, the user's game numbers may be stored in the memory of the controller 100 at block 564 and may be included in the image 522 on the display 520 at block 566. After a certain amount of time, the keno game may be closed to additional users (where a number of users are playing a single keno game using multiple gambling units 20).

If play of the keno game is to begin as determined at block 568, at block 570 a game number within a range set by the casino may be randomly selected either by the controller 100 or a central computer operatively connected to the controller, such as one of the network computers 22, 32. At block 572, the randomly selected game number may be displayed on the display unit 70 and the display units 70 of other gaming units 20 (if any) which are involved in the same keno game. At block 574, the controller 100 (or the central computer noted above) may increment a count which keeps track of how many game numbers have been selected at block 570.

At block 576, the controller 100 (or one of the network computers 22, 32) may determine whether a maximum number of game numbers within the range have been randomly selected. If not, another game number may be randomly selected at block 570. If the maximum number of game numbers has been selected, at block 578 the controller 100 (or a central computer) may determine whether there are a sufficient number of matches between the game numbers selected by the user and the game numbers selected at block 570 to cause the user to win. The number of matches may depend on how many numbers the user selected and the particular keno rules being used.

If there are a sufficient number of matches, a payout may be determined at block 580 to compensate the user for winning the game. The payout may depend on the number of matches between the game numbers selected by the user and the game numbers randomly selected at block 570. At block 582, the user's cumulative value or number of credits may be updated by subtracting the bet made by the user and adding, if the keno game was won, the payout value determined at block 580. The cumulative value or number of credits may also be displayed in the display area 540 (FIG. 11).

Video Bingo

Figure 14:
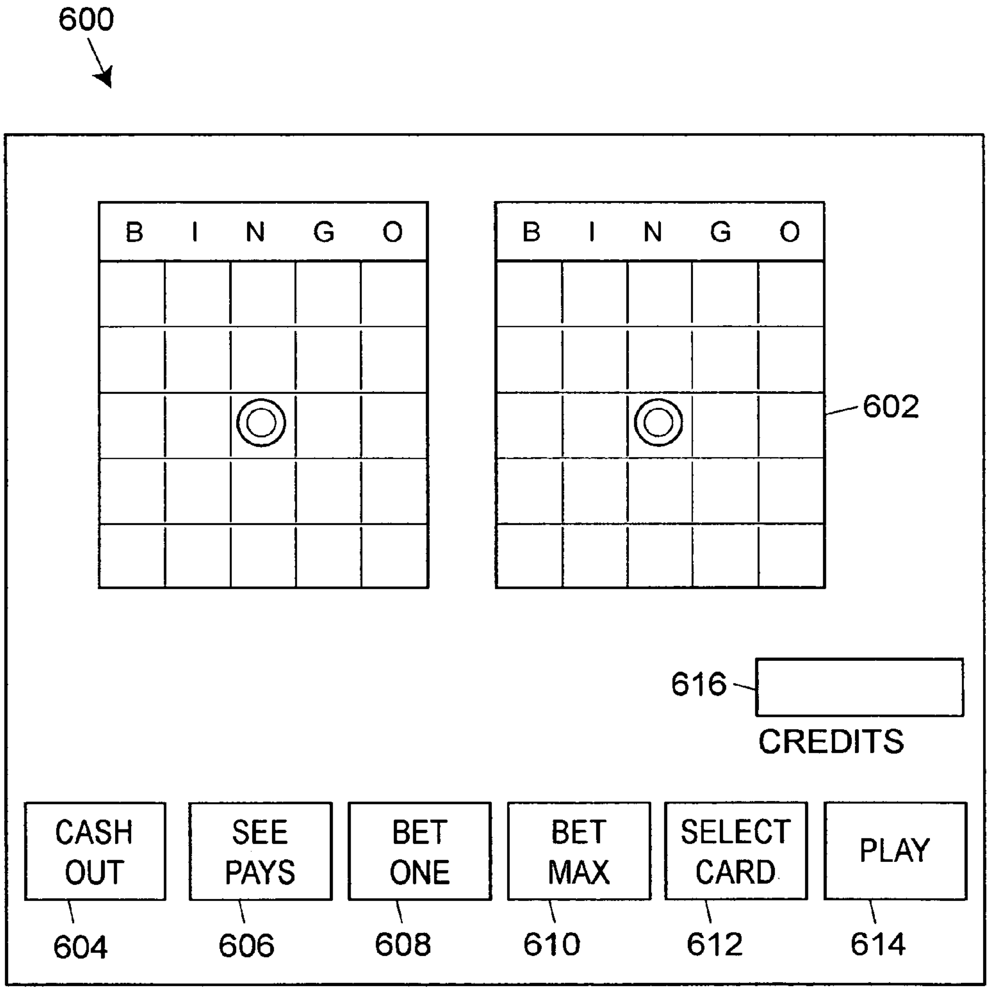
FIG. 14 is an illustration of an embodiment of a visual display that may be displayed during performance of the video bingo routine of FIG. 15.

FIG. 14 is an exemplary display 600 that may be shown on the display unit 70 during performance of the video bingo routine 250 shown schematically in FIG. 4. Referring to FIG. 14, the display 600 may include one or more video images 602 of a bingo card and images of the bingo numbers selected during the game. The bingo card images 602 may have a grid pattern.

To allow the user to control the play of the bingo game, a plurality of user-selectable buttons may be displayed. The buttons may include a "Cash Out" button 604, a "See Pays" button 606, a "Bet One Credit" button 608, a "Bet Max Credits" button 610, a "Select Card" button 612, and a "Play" button 614. Alternatively, users may input their selections using the scanner 650. This enables the user to prepare their selections at the users convenience without having to wait for a game to start or for a gaming unit 20 to be available. The display 600 may also include an area 616 in which the number of remaining credits or value is displayed. If the display unit 70 is provided with a touch-sensitive screen, the buttons may form part of the video display 600. Alternatively, one or more of those buttons may be provided as part of a control panel that is provided separately from the display unit 70.

Figure 15:
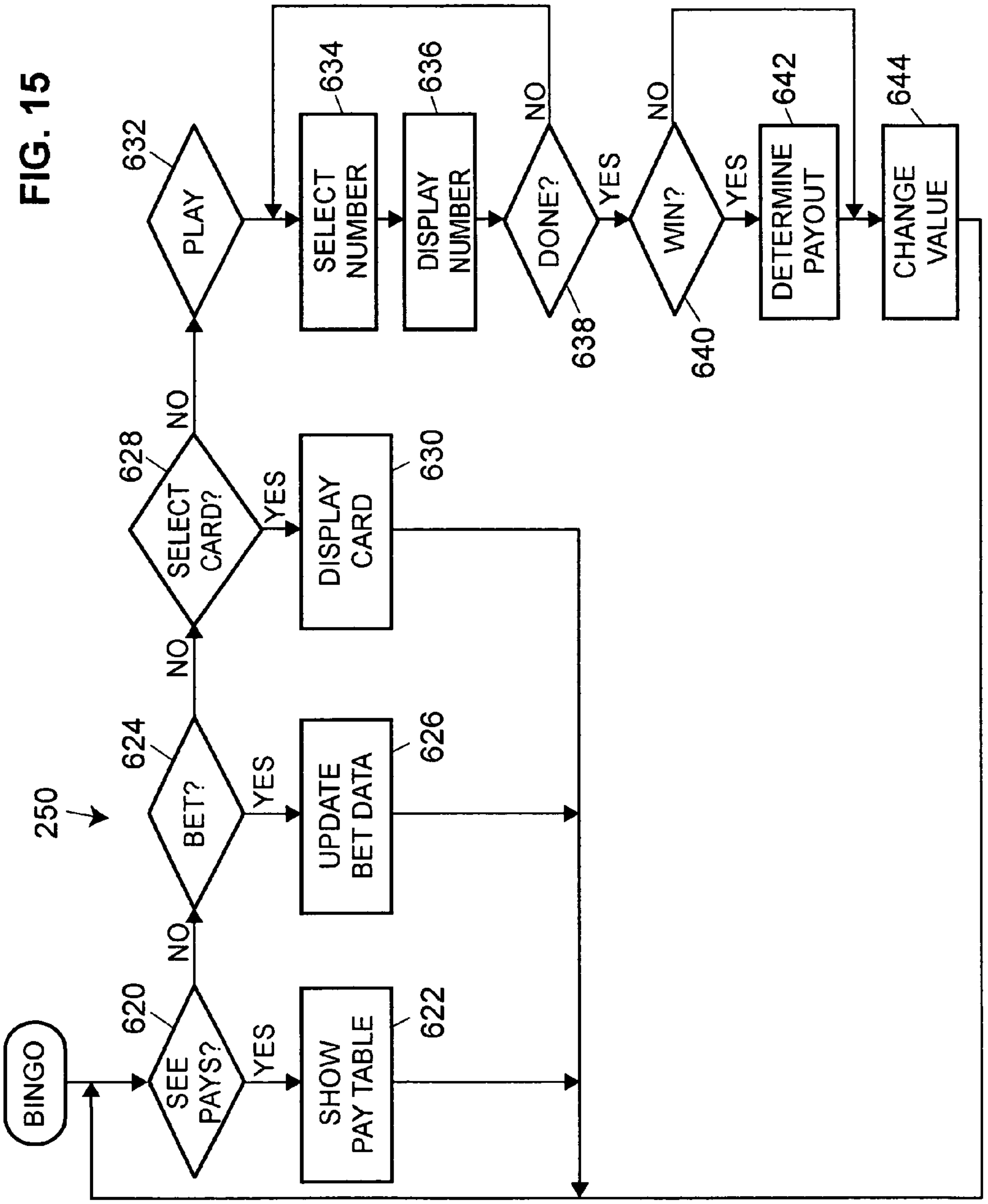
FIG. 15 is a flowchart of an embodiment of a video bingo routine that may be performed by one or more of the gaming units.

FIG. 15 is a flowchart of the video bingo routine 250 shown schematically in FIG. 4. The bingo routine 250 may be utilized in connection with a single gaming unit 20 where a single user is playing a bingo game, or the bingo routine 250 may be utilized in connection with multiple gaming units 20 where multiple users are playing a single bingo game. In the latter case, one or more of the acts described below may be performed either by the controller 100 in each gaming unit 20 or by one of the network computers 22, 32 to which multiple gaming units 20 are operatively connected.

Referring to FIG. 15, at block 620, the routine may determine whether the user has requested payout information, such as by activating the "See Pays" button 606, in which case at block 622 the routine may cause one or more pay tables to be displayed on the display unit 70. At block 624, the routine may determine whether the user has made a bet, such as by having pressed the "Bet One Credit" button 608 or the "Bet Max Credits" button 610, in which case at block 626 bet data corresponding to the bet made by the user may be stored in the memory of the controller 100.

After the user has made a wager, at block 628 the user may select a bingo card, which may be generated randomly. The user may select more than one bingo card, and there may be a maximum number of bingo cards that a user may select. After play is to commence as determined at block 632, at block 634 a bingo number may be randomly generated by the controller 100 or a central computer such as one of the network computers 22, 32. At block 636, the bingo number may be displayed on the display unit 70 and the display units 70 of any other gaming units 20 involved in the bingo game.

At block 638, the controller 100 (or a central computer) may determine whether any user has won the bingo game. If no user has won, another bingo number may be randomly selected at block 634. If any user has bingo as determined at block 638, the routine may determine at block 640 whether the user playing that gaming unit 20 was the winner. If so, at block 642 a payout for the user may be determined. The payout may depend on the number of random numbers that were drawn before there was a winner, the total number of winners (if there was more than one user), and the amount of money that was wagered on the game. At block 644, the user's cumulative value or number of credits may be updated by subtracting the bet made by the user and adding, if the bingo game was won, the payout value determined at block 642. The cumulative value or number of credits may also be displayed in the display area 616 (FIG. 14).

Multi-Purpose Gaming Unit

Modern gaming machines may be connected to a network 40 via ethernet or any other similar communication scheme. Such networks may be networks of sufficient speed to allow additional functionality to be added to the gaming unit. For example, the display unit 70 may be able to display to the user a wide range of data and services traditionally seen on personal computers that are connected to the Internet such as email, web browsing, etc. Of course, care may have to be taken by the casino to ensure users do not spend all their time on activities that do not make-money for the casino. In one example, the casino may charge the user a fee for using non-revenue generating services based on the time used by the user. This fee may be deducted from the credits the user has on the gaming unit. In another example, the casino may require that the user actually play a game of chance involving placing a bet at least once during a given period of time, such as five minutes. In yet another example, the casino may require that the user view an advertisement in exchange for allowing the user participate in using the multi-purpose terminal for non-betting activities.

The casino may also make additional information available to users. For example, the casino may present the user an option to display the timetable for shows at the casino. As another example, the gaming unit 20 may present the user the option to display a map of the casino. As a further example, the gaming unit 20 may present to the user a list of restaurants in association with the gaming establishment and may allow a user to review a menu for the restaurant, check on availability of reservations, make reservations or even order take out food all from the gaming unit.

Figure 19:
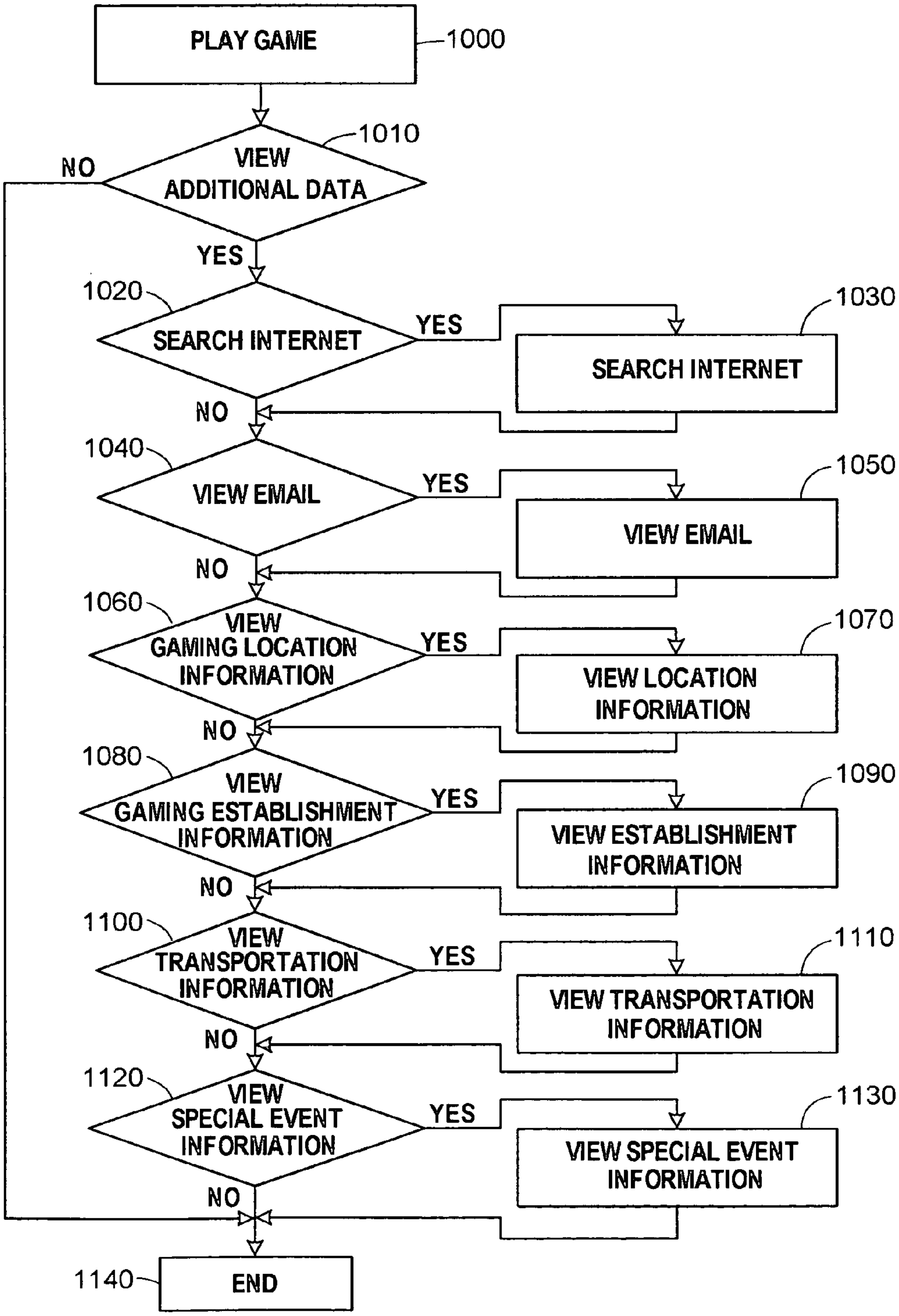
FIG. 19 is a flowchart of an embodiment of a routine to view additional information on a gaming unit that may be performed by one or more of the gaming units.

FIG. 19 illustrates one potential embodiment of a routine of displaying additional data. At block 1000, the routine begins by allowing a user to play a game. At block 1010, the user may be presented the option to view additional data on the display unit 70. If the user selects no, control may be passed to block 1140 where the method may end. If the user selects to view additional data, a block 1020 may allow a user to select to search the Internet using a traditional web browser such as Microsoft's Internet Explorer. The web browser may be modified to highlight the gaming establishment, the location, or any other entity willing to pay to be highlighted. If the user declines to search the Internet, control may pass to block 1040. If the user chooses to search the Internet, at block 1030, the user may search the Internet after which control may pass to block 1040. At block 1040, the user may be presented the option to view email. If the user declines to view email, control may pass to block 1060. If the user selects to view email at block 1050, the user may access email on the gaming unit after which control may pass to block 1060. At block 1060, the user may be presented the option to view gaming location information. If the user declines to view gaming location information, control may pass to block 1080. If the user selects to view gaming location information, control may pass to block 1070 where gaming location information is displayed after which control may pass to block 1080. At block 1080, the user may be presented the option to view gaming establishment information. If the user declines to view gaming establishment information, control may pass to block 1100. If the user selects view gaming establishment information, control may pass to block 1090 where gaming establishment information is displayed after which control may pass to block 1100. At block 1100, the user may be presented the option to view transportation information. If the user declines to view transportation information, control may pass to block 1120. If the user selects to view transportation information, control may pass to block 1110 where transportation information may be displayed on the gaming unit after which control may pass to block 1120. At block 1120, the user may be presented the option to view special event information. If the user declines to view special event information, control may pass to block 1140 where the routine may end. If the user selects to view special event information, control may pass to block 1130 where special event information may be displayed on the gaming unit after which control may pass to block 1140 where the routine may end.

Another additional functionality to the multi-function gaming unit 20 may be to create player tracking cards. The user may be able to input the necessary information into the gaming unit via a touch screen, for example, and the gaming unit may contain a device such as those offered by Eltron Card Printers, Zebra Card Printers, Pebble Card Printers, Evolis Card Printers, B&C Data Systems Card Printers, Fargo Card Printers, CIMAGE Card Printers and Rio Card Printers that can create player tracking type cards in an acceptable amount of time and may be able to interface with existing gaming units 20. As the gaming unit 20 is part of the network 40, the information entered by the user may be stored by the casino such that the information entered by the user can be stored and tracked like any other player tracking card. The card printers may be visually similar to a traditional ticket reader/printer 56.

Figure 20:
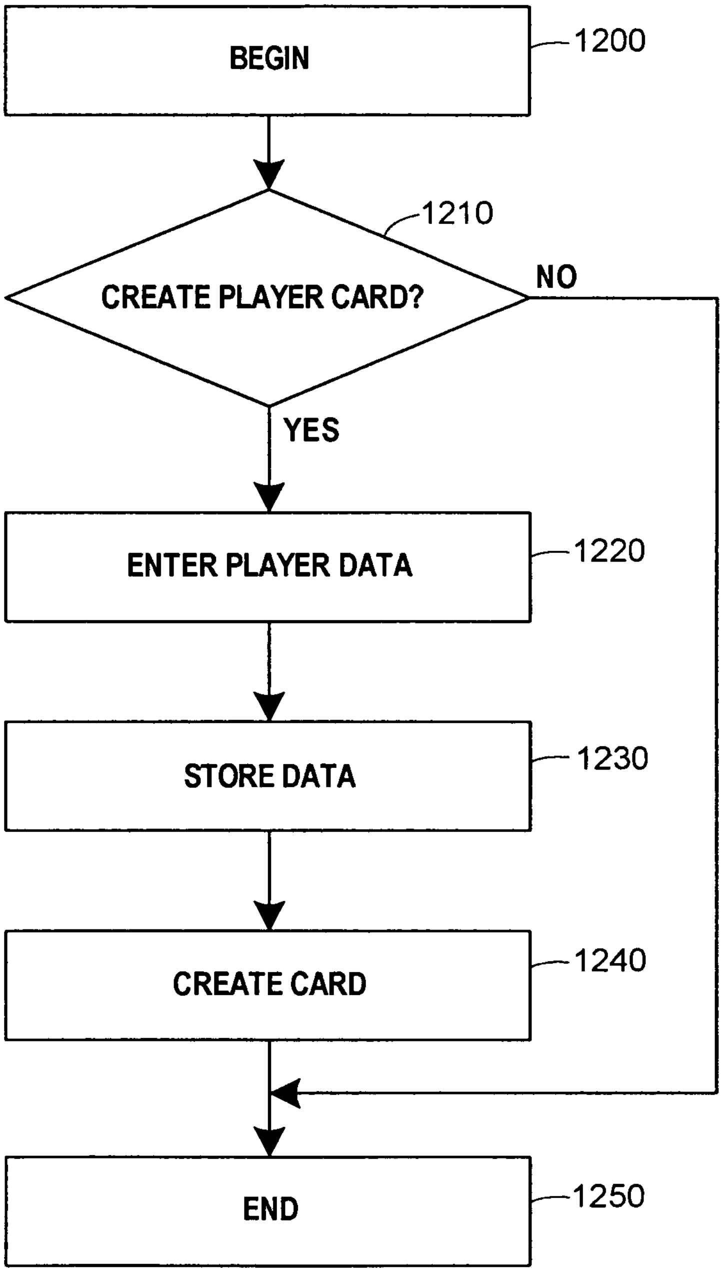
FIG. 20 is a flowchart of an embodiment of a routine to create a player card at a gaming unit that may be performed by one or more of the gaming units.

FIG. 20 illustrates one potential embodiment of a routine of creating a player card at a gaming unit. At block 1200, the routine may begin. At block 1210, the user may be presented the option to create a player card. If the user declines to create a player card, control may pass to block 1250 where the routine may end. If the user desires to make a player card, control may pass to block 1220 where the user may be requested to enter player data. Player data may include the user's name, the user's address, the user's phone number, the user's email address, any of the user's preferred games or any other related preferences. Control may pass to block 1230 where the data that was entered at block 1220 is stored. Control then may pass to block 1240 where the gaming unit may create the player card. Control then may pass to block 1250 where the routine may end.

Scanning Ability

Figure 16:
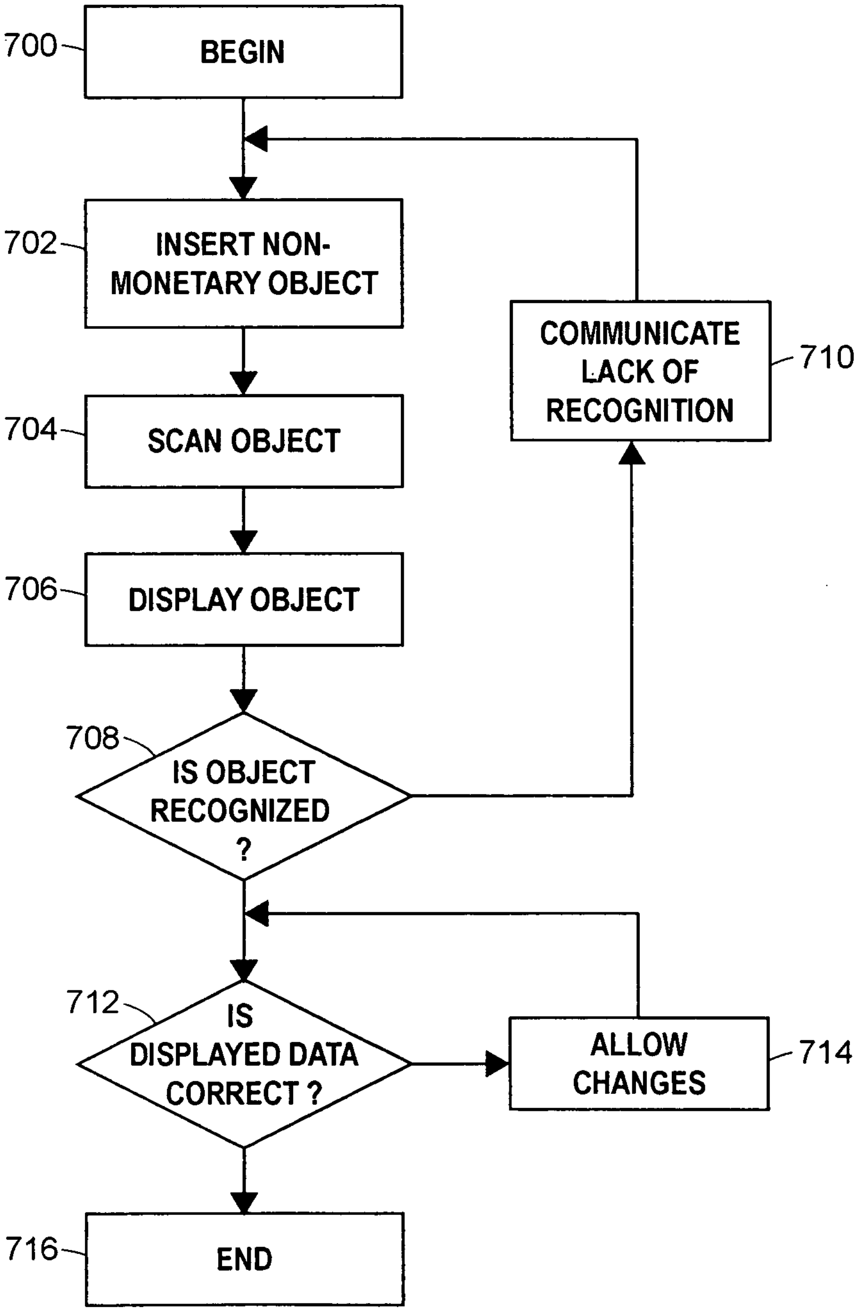
FIG. 16 is a flowchart of an embodiment of a scanning routine that may be performed by one or more of the gaming units.

FIG. 16 is a flowchart of a method of scanning an object 648 inserted into the gaming unit 20. The scanner 650 in the gaming machine may be a traditional value input device or scanner such as a paper currency acceptor 54 as sold by Japan Cash Machine, Mars Electronic Inc. or Ardac, may be the ticket reader/printer 56, may be the card reader 58 or may be a scanner 650 with increased functionality such as a scanner 650 that is traditionally attached to a personal computer such as a scanner 650 sold by Canon, Brother, Epson, Hewlett-Packered and the like.

Traditional gaming scanners 650 such as the paper currency acceptor 54 may scan three different spots on the object 648 inserted into the gaming unit 20. Accordingly, the scan provides data to the controller 100 from three different sensors as the inserted object 648 flows across the three sensors. The scanner 650 with additional functionality, for example, a personal computer type scanner 650 may be capable of scanning 1200 dots per inch of the object 648 that flows across it. Scanners 650 with higher dots per inch scanning capability are available and may also be used. As a result, the entire width of the object 648 may be scanned rather than three regions as in a traditional paper currency acceptor or gaming scanner 54 and the data of the scan of the width of the entire object 648 may be provided to the controller 100.

Referring again to FIG. 16, at block 700, the method begins. At block 702, the object 648 is inserted into the scanner 650 attached to the gaming unit 20. The scanner 650 may be a traditional paper currency acceptor 54 or the scanner 650 with additional functionality. At block 704, the object 648 inserted into the scanner 650 in the gaming unit 20 may be scanned by the scanner 650. The scanner 650 may transmit data representing a digital representation or scan 652 of the object 648 to the controller 100. The object 648 could be virtually any object 648 that will fit through the scanner 650. Example of objects 648 that may be inserted into the scanner 650 are credit cards, drivers licenses, keno bet slips, sports book bet slips, player tracking cards and the like. The bet slips may be formatted to be read by the traditional scanner 650 or may be bet slips that can be read by the scanner 650 with additional functionality. For example, the bet slip may be designed such that the choices made by the user will pass under the three sensors of a traditional scanner 650. In the alternative, the scanner 650 with increased functionality may read in virtually any object 648 containing communication so long as it is formatted to fit through the scanner 650.

The object 648 may be a preformatted form designed to assist the user complete a specific task. For example, the object 648 may be a preformatted form for a keno game. By preformatting the object 648, the gaming establishment can assist the user in providing all the required information. The user can see from the preformatted form that certain spaces must be filled in for the form to be properly entered. The use of check boxes and data entry fields will make it obvious to the user that certain information is required. As an example, a preformatted form could be created for betting on professional football where there would be a data entry field for the home team, a data entry field for the visiting team and check boxes next to each data entry field to indicate which team the user believes will be the winner against the spread. By using preformatted forms, optical character recognition is easier as the scanner 650 will know in advance the areas of the forms where the key information is located. Keno, bingo, sports book, membership applications, free drink coupons and the like may lend themselves to preformatted forms.

At block 706 the controller 100 may display the scan 652 of the object 648 on the display 70. At block 708, the controller 100 determines whether the scan 652 is recognized. The controller 100 may compare the digital data representing the scan 652 to digital data of other known acceptable objects 654 to determine if the scan 652 is recognized. From example, if a user inserts a stick of gum into the scanner 650, the controller 100 may compare the digital representation of the stick of gum 652 to other known digital representations 654. As the scan 652 of the stick of gum may not match another known scan 654, block 710 may communicate to the user that the object 648 is not recognized by, for example, displaying a message on the display 70 that the object 648 inserted into the scanner 650 does not match a known scan 654 or is not recognized and control may pass to block 702. The controller 100 may determine that the object is recognized if the digital data representing the scan 652 is determined to be similar to digital data representing acceptable object 654 such as drivers licenses, credit cards, player tracking cards, keno bet slips and the like.

A block 712 may ask the user whether the displayed scan 652 is correct. In some instances, a user may insert an object 648 into the scanner 650 that is dirty or partially obscured and block 712 will allow the user to approve or disapprove the scan 652 of the object 648. If the user disapproves of the scan 652 of the object 648, control may pass to block 714 where the user may be presented the option to modify the displayed scan 652 of the object 650. If the user approves of the display of the object 650, the controller 100 may store the digital information of the scan as an approved scan 656 and the method may end at block 716.

In addition, after the object 650 is scanned at block 704, the scan 652 may be subjected to an optical character recognition routine. Optical character recognition routines are well known and may evaluate the scanned image 652 and attempt to recognize known characters in the scan 652. Accordingly, the recognized characters may be treated as text with the characters being searchable and savable as text. In addition, the text may be tested against known databases to determine if the object 648 inserted in the scanner 650 on the gaming unit 20 is recognized. For example, if a credit card is inserted into the gaming unit 20, the credit card may be scanned, an optical character recognition routine may review the scan 652 and the text (including any numbers) from the credit card may be reviewed against known credit card databases to determine if the card is an acceptable credit card. The data may be stored as first identification data and second identification data. In addition, the name on the credit card may be tested to determine that it accurately matches the number on the card. As another example, if a user inserts a drivers license, the scanned in name may be stored as the first identification data and the license number may be stored as second identification data and both the scanned in name and license number may be checked against known databases to determine whether the license is accurate and should be authorized. As described in block 714, users of the gaming machine may have the opportunity to modify the text.

Figure 16A:
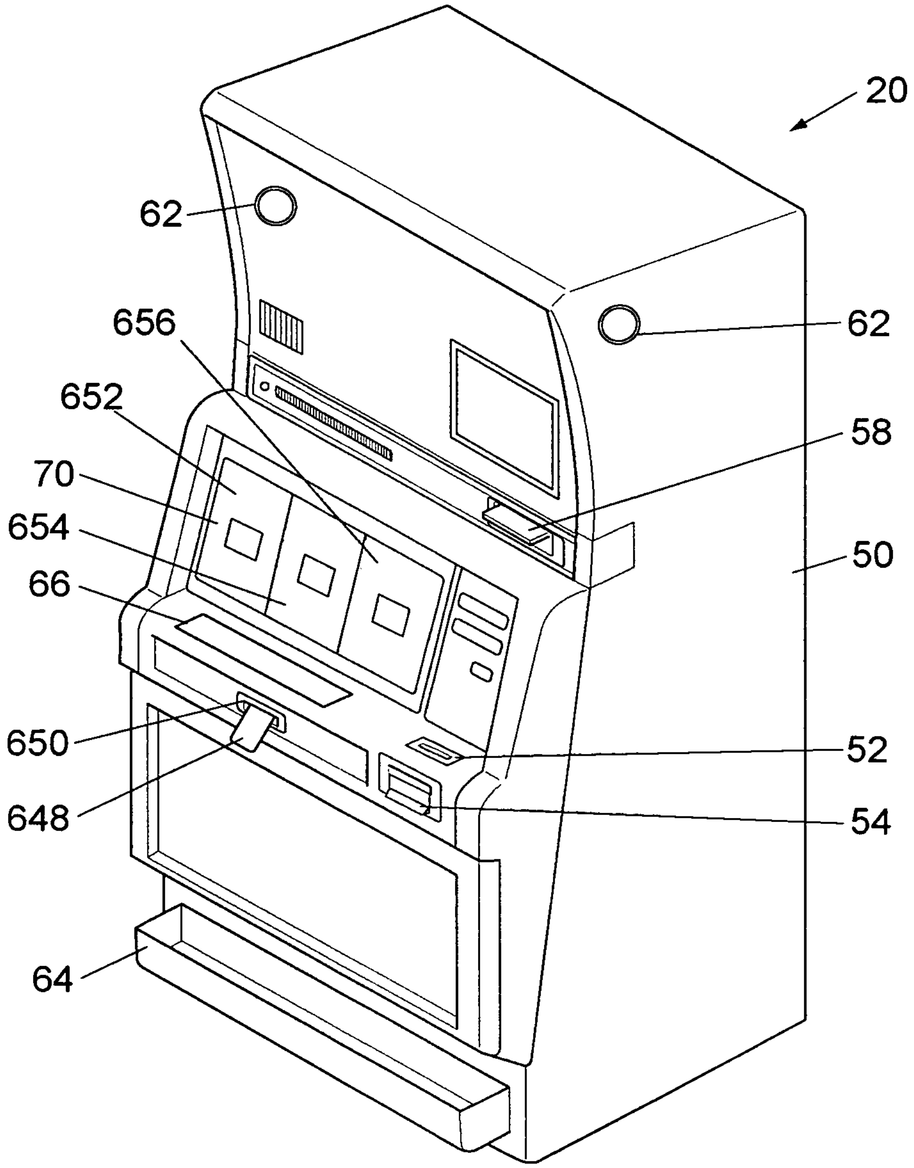
FIG. 16*a* is a perspective view of an embodiment of one of the gaming units shown schematically in FIG. 1 cabable of performing the routine of FIG. 16.

A gaming unit 20 with the improved scanner 650 is illustrated in FIG. 16*a*. The object 648 is inputted into the gaming unit 20 through the scanner 650. As previously explained, the object 648 may be a betting voucher. The initial scanned image 652 may be displayed on a portion of the display unit 70. The gaming unit 20 also may display the most closely related known acceptable image 654 to the user or the image may be kept in memory. The display 70 also may display the approved scan 656 on the display 70, either alone or with the other image of the initial scan 652.

If the scan 652 is approved, the gaming unit 20 may perform a variety of routines based on the scan 652. If the scan 652 was of a bet slip, a bet on a particular event may be entered. For example, a user may place a bet that the Chicago Bears may beat the Green Bay Packers by more than 7 points (the spread) by selecting a box on a bet slip that is read by the scanner 650, approved by the user and entered into the sport book at a casino. Similarly, a keno card may be read into the system through the scanner 650 and a user may be entered into a keno game based on the keno card scan 652.

The routine also may allow the user to apply for a player tracking card. By scanning in a drivers license, for example, the system may be able to gather sufficient data to automatically have the user apply for a player tracking card. In addition, block 714 may allow the user to add additional information that may be needed to complete the player tracking card application. The system may also be able to use the data from the scanned in object to research known databases to fill in further information on the player tracking application. For example, if a credit card is scanned, the name and credit card number may be entered into a database of credit card numbers and names and the relevant address of the credit card holder may be filled in on the application.

The routine may allow the user to collect player tracking points. For example, if a user forgot a player tracking card or prefers not to carry one, a user may scan in his drivers license instead. The system may then match the scanned data from the drivers license to the data in the player tracking database and the system may access the player tracking account of the user without having the user insert his player tracking card.

The gaming unit 20 also may be able to redeem winning bet slips including bet receipts from the sport book itself. For example, a user may have won a wager on sporting event on a bet he placed at the sport book. The user may be able to insert the receipt from the sports book into the gaming unit scanner 650 and gain credits on the gaming unit 20 based on the sports book receipt.

The gaming unit 20 also may be able to arrange other service that a casino may offer. For example, a casino may offer shows, concerts, circuses, shopping, aquariums, roller coasters, spas, sports, sporting events, restaurants, clubs and bars to entice customers. Users may be able to write down a request and insert it into the scanner 650 where the request will proceed through the blocks in FIG. 16, except that the object 648 will be a request to see a show, for example, rather than play keno.

The gaming unit 20 may be able to read in configuration information from the scanner 650. For example, input objects or slips may be created that will be recognized by the gaming unit 20 as being configuration objects. The configuration objects may be pieces of paper with encrypyed configuration information. The objects may be able to accomplish all the tasks normally associated with configuring a game such as switching the games available in a multi-game unit, witching the denomination of the game or switching the triggering mechanism to enter into a bonus round.

A printout may be created to memorialize the transaction. For example, sports books normally hand a user a receipt when a bet is placed and this receipt is used to collect winnings if the user is a winner. A similar receipt may be printed when a user places a bet through the gaming system. In addition, the gaming system may produce a cashless gaming voucher such as an EZ Pay stub which may be redeemed at another station.

Figure 17:
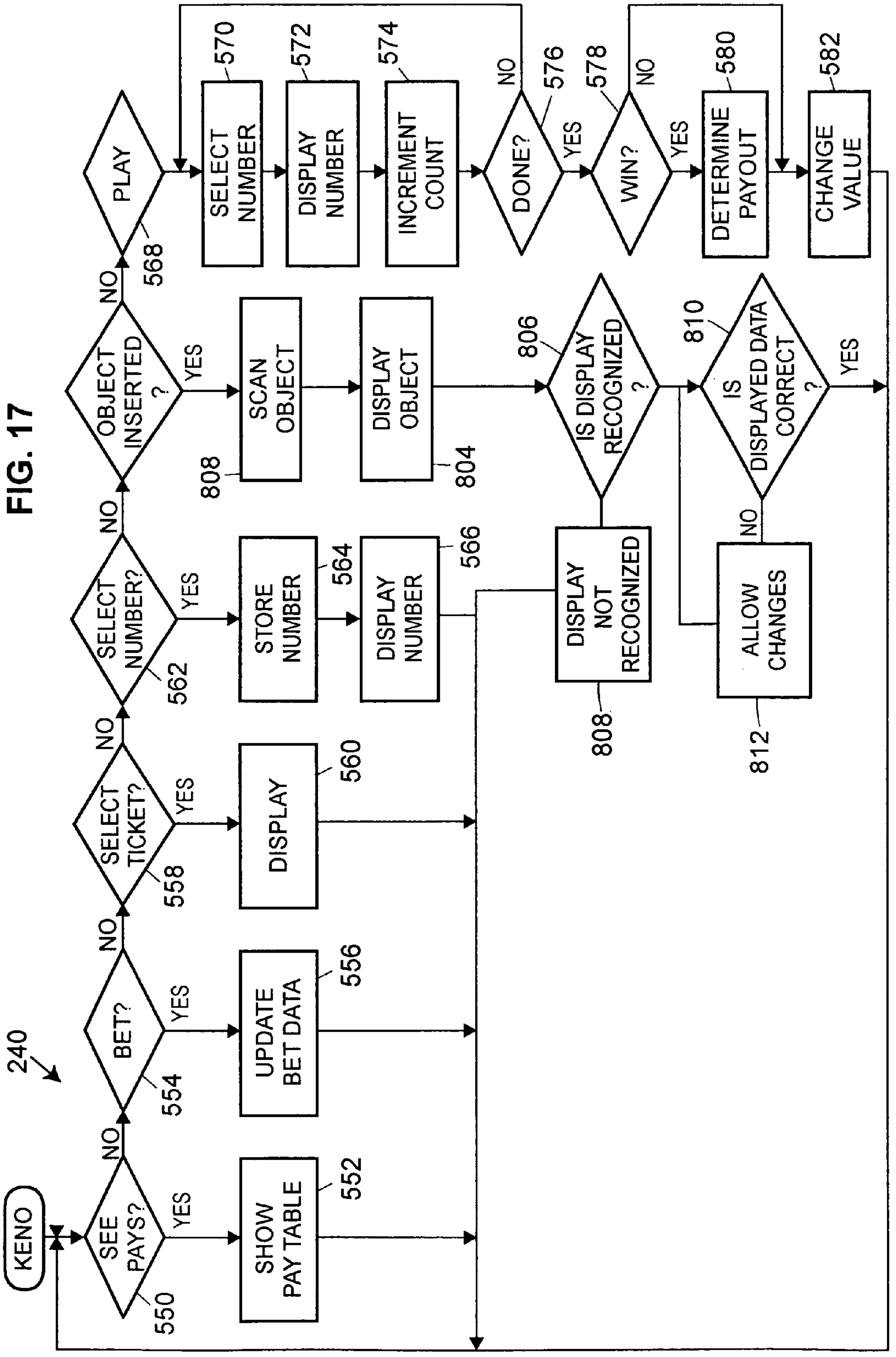
FIG. 17 is a flowchart of an embodiment of a video keno routine including a scanning routine that may be performed by one or more of the gaming units.

FIG. 17 illustrates a modified version of Keno with scanning capability. It is very similar to FIG. 13, with additional blocks 800 through 812 added and the blocks 550 through 582 are similar to those described in relation to FIG. 13. At block 800, the gaming unit determines whether an object has been inserted into the scanner. If an object has been inserted, at block 802, the object will be scanned. At block 804, the controller 100 may display the scan 652 of the object 648 on the display 70. At block 806, the controller 100 determines whether the scan 652 is recognized. The controller 100 may compare the digital data representing the scan 652 to digital data of other known acceptable objects 654 to determine if the scan 652 is recognized. For example, the controller 100 may compare the digital data representing the scan 652 to the digital data of known keno forms such as preformatted keno forms. Block 808 may communicate to the user that the object 648 is not recognized by, for example, displaying a message on the display 70 that the object 648 inserted into the scanner 650 does not match a known scan 654 or is not recognized and control may pass to block 550. The controller 100 may determine that the object is recognized if the digital data representing the scan 652 is determined to be similar to digital data representing acceptable object 654 such as a preformatted keno bet slip.

A block 810 may ask the user whether the displayed scan 652 is correct or if any needed information is missing. For example, a user may select numbers to be played in a keno game but the user may forget to specify the amount of the bet and this may be indicated on the display 70. If the user disapproves of the scan 652 of the object 648, control may pass to block 812 where the user may be presented the option to modify the displayed scan 652 of the object 650. If the user approves of the display of the object 650, the controller 100 may store the digital information of the scan as an approved scan 656 and the method may return to block 550 and the method continues as described in relation to FIG. 13. The approved scan can then be transmitted through the network 40 and the user can participate in a network wide keno game.

Figure 18:
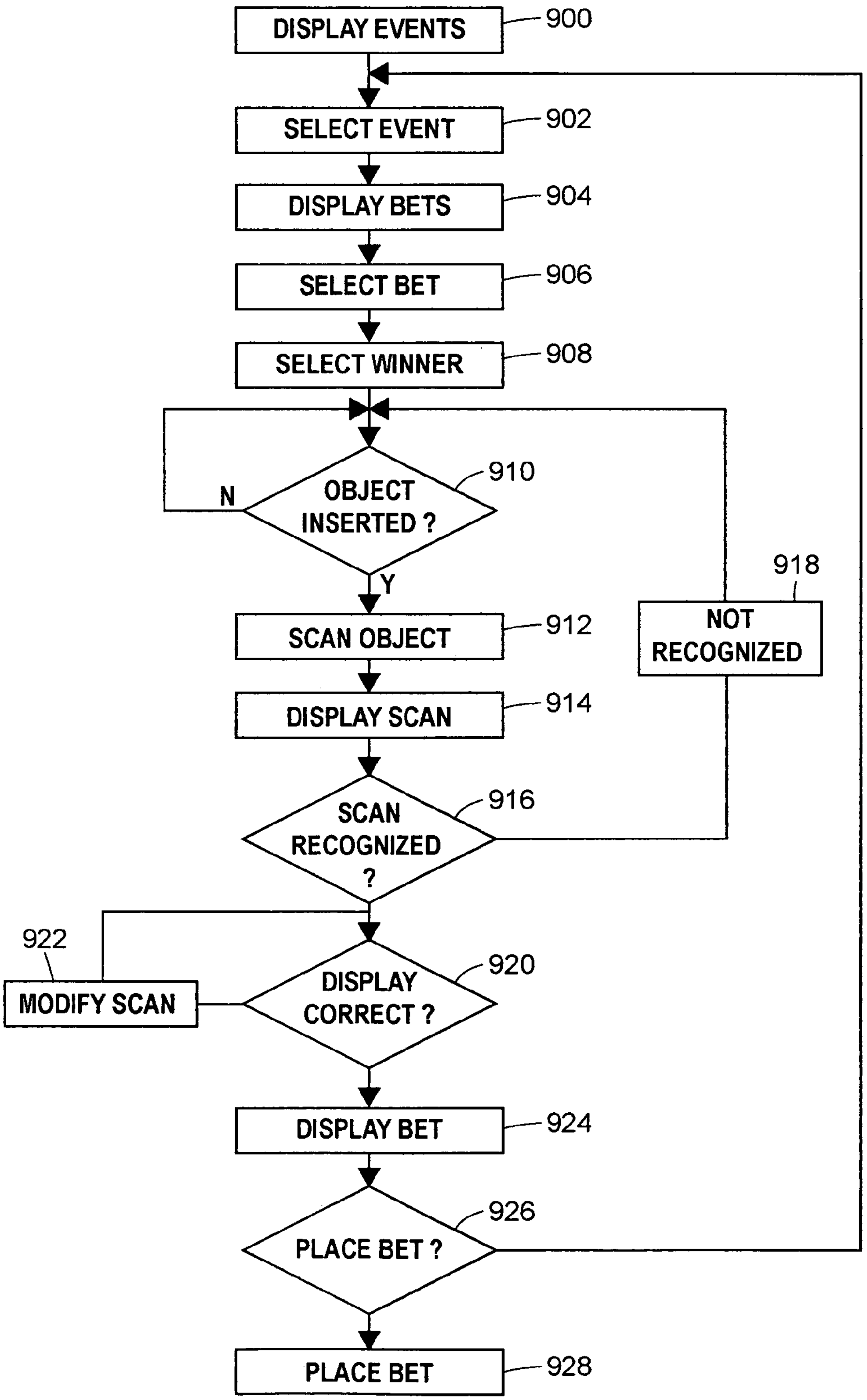
FIG. 18 is a flowchart of an embodiment of a sportsbook routine including a scanning routine that may be performed by one or more of the gaming units.

FIG. 18 is another example of the system, this time applied to sports book. At block 900, the controller may display on the display device 70 all the events available for betting. The events may be separated by sport, such as football games, baseball games, horse races, etc. At block 902, the user may select an event on which to bet. At block 904, the controller may display on the display device 70 all the available bets on the event selected. For example, in a football game, a user may be able to bet on the winner in view of a point spread or the user may be able to bet on the total number of points that will be scored in the football game. Many other types of bets are available and are understood by one skilled in the art. At block 906, the user may select a type of bet. At block 908, the user can select a side of the bet. For example, in a football game bet, the user will select one team or the other with respect to the spread or the number of points by which one team is favored.

At step 910, the gaming unit 10 determines whether an object has been inserted into the scanner. If an object has been inserted, at block 912, the object will be scanned. At block 914, the controller 100 may display the scan 652 of the object 648 on the display 70. At block 916, the controller 100 determines whether the scan 652 is recognized. The controller 100 may compare the digital data representing the scan 652 to digital data of other known acceptable objects 654 to determine if the scan 652 is recognized. For example, the controller 100 may compare the digital data representing the scan 652 to the digital data of known sportsbook forms. Block 918 may communicate to the user that the object 648 is not recognized by, for example, displaying a message on the display 70 that the object 648 inserted into the scanner 650 does not match a known scan 654 or is not recognized and control may pass to block 550. The controller 100 may determine that the object is recognized if the digital data representing the scan 652 is determined to be similar to digital data representing acceptable object 654 such as a preformatted sports bet slip.

A block 920 may ask the user whether the displayed scan 652 is correct or if any needed information is missing. For example, a user may select teams in a football game but the user may forget to specify the amount of the bet and this may be indicated on the display 70. If the user disapproves of the scan 652 of the object 648, control may pass to block 922 where the user may be presented the option to modify the displayed scan 652 of the object 650. If the user approves of the display of the object 650, the controller 100 may store the digital information of the scan as an approved scan 656. At block 924, the controller 100 may display the bet as currently selected. At block 926, the user will have the option of placing the bet or canceling the bet. If the user cancels the bet, control may pass to block 902. If the user selects to place the bet, at block 928 the bet may be communicated to the sportsbook via the network 40. Other casino games can be modified in a similar manner to use the scanner with increased functionality.

Once a user has been placed a bet on event that will occur in the future such as a horse race or a football game, the user may be issued a receipt or voucher by the gaming unit. The receipt may be an E-Z Pay voucher, or a similarly created voucher that may have an encrypted coding printed on it that is used to verify the authenticity of the voucher. It also may have unencrypted printing that may indicate the event wagered upon and the selections made by the user.

After the voucher is issued, the user may use the voucher to check on the status of the event underlying the bet. For example, if the user bet on a football game, the user may input the voucher as an object 648 into a scanner 650 that is in communication with the gaming unit 20 and the user may view on the display unit 70 a display of the current score of the football game. In another example, the user may be able to view the game as it is in progress for a period of time. If the user wishes to continue to view the football game, the user may be required to insert additional funds into the gaming unit 20.

If the underlying event is over, the user may be able to view the final outcome of the event such as the final score of a football game or the final standings of a horse race. In addition, the user may be presented with options to view addition video or still shots of the underlying event. For example, if the user bet on a horse race, the user may be presented with the option to view the entire race or the relevant portions of the race. Similarly, if the underlying event was a football game, the user may be presented the opportunity to view key events of the football game such as a winning field goal or an especially important play. The user may be able to view box scores, news reports and commentaries on game.

As part of the display of the underlying event, advertisements may be inserted. For example, the casino may display a brief advertisement for events at the casino while the desired video is loaded to the gaming unit to be displayed. As another example, the video may be sponsored by the entity related to the underlying event such as ESPN providing advertising for bets where the underlying event is a sport such as football.

In addition, after the voucher has been inputted, scanned and the voucher has been determined to be a winner, additional options may be available to the user. For example, the user may be able to transfer the winnings over as credits to the gaming unit 20. As another example, the user may be able to use the winnings to purchase casino based products such as room upgrades, show tickets, sight-seeing tours, spa related purchases, etc. As yet another example, the user may be able to purchase a vacation in the future using the winning credits. The user may also be able to use the credits to place additional wagers.

Having a voucher may also entitle the user to view additional information that may not be available to other users. For example, by inserting a gaming voucher, the gaming unit may display to the user additional betting opportunities. The initial betting opportunities presented may be related to the previous bet. For example, if a previous bet was on a National Football League game, additional bets on National Football League games may be presented with all other betting option being available on further screens.

The gaming establishment may also desire to provide additional information to the user based on the previous wagers made by the user. For example, additional information such as injury reports to users in key games may be available to users. The users may be able to search through additional information sources to assist in the placing of bets.

Figure 21:
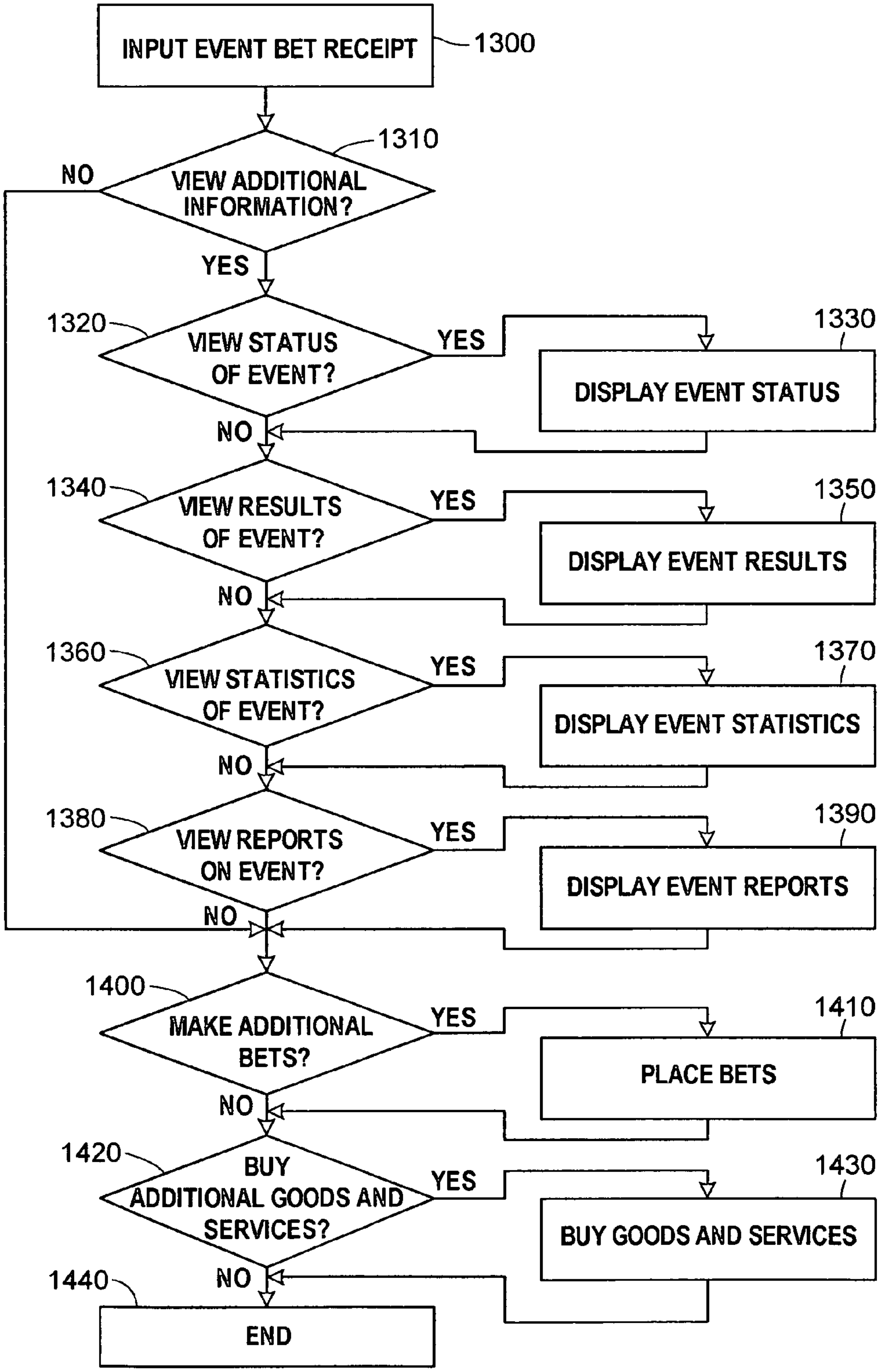
FIG. 21 is a flowchart of an embodiment of a routine to view additional information about an event that was a basis of a bet that may be performed by one or more of the gaming units.

FIG. 21 illustrates one possible routine for displaying additional data after inputting a betting receipt into the gaming machine 20. At block 1300, the routine may begin by having a user input the betting receipt as an object 648 into the scanner 650 in the gaming unit 20. The scan then may be subject to the approval and modification routine as described in FIG. 17. At block 1310, the user may be presented on the display device 70 the option to view additional information regarding the betting event. If the user declines to view additional information, control may pass to block 1400. If the user desires to view additional information, the user may be presented additional options. At block 1320, the user may be presented the option to view the status of the underlying event. If the user declines to view the status of the event, control may pass to block 1340. If the user desires to view the status of the event, at block 1330 the status of the event is displayed on the gaming unit and control passes to block 1340. At block 1340, the user is presented the option to view the results of the event underlying the bet. If the user declines to view the results of the event, control may pass to block 1360. If the user desires to view the results of the event underlying the bet, control may pass to block 1350 where the results of the event are displayed and control may pass to block 1360. The results of the event may not be limited to just the scores of the event, but may include video highlights of the actual event and any key highlights of the game. At block 1360, the user may be presented the option to view statistics of the underlying event. If the user declines to view statistics of the underlying event, control may pass to block 1380. If the user desires to view statistics of the event, control may pass to block 1370 where the event's statistics are displayed and control may pass to block 1380. At block 1380, the user may be presented the option to view reports on the event. If the user declines to view reports on the event, control may pass to block 1400. If the user desires to view reports on the event, control may pass to block 1390 where reports on the event are displayed. The reports may not be limited to written reports, but may also include television reports and highlights of the underlying event. At block 1400, the user may be presented the option to make additional bets. If the user declines, control may pass to block 1420. If the user desires to place bets, control may pass to block 1410 where additional bets can be placed on other events. At block 1420, the user may be presented the option to buy additional goods and services using the credits on the gaming machine. If the user declines, control may pass to block 1440 where the routine may end. If the user desires to use credits to buy goods and services at block 1430, the user may buy goods and services as displayed on the gaming unit 20 and control may pass to block 1440 where the routine may end.

What is claimed is:

1. A gaming apparatus comprising:
- a display unit that is capable of generating video images for a game of a first game type;
- an input device;
- a controller operatively coupled to the display unit and the input device, the controller comprising a processor and a memory operatively coupled to the processor,
- a network interface connected to a network and to the controller;
- the controller programmed to play the game of the first game type;
- the controller programmed to allow a user to access a network, to allow the user an option of inserting into the input device a betting receipt representing a separate bet previously made on a remotely occurring event that is not a bet on a game of the first game type, and to allow the user to view on the display unit data related to the game of the first game type and view additional data related to the remotely occurring event.

2. The gaming apparatus of claim 1, wherein the additional data further comprises an email interface.

3. The gaming apparatus of claim 1, wherein the additional data further comprises an Internet browser interface.

4. The gaming apparatus of claim 1, wherein the additional data further comprises at least one of a group of:
- gaming location related information;
- gaming establishment related information;
- transportation related information; and
- special event related information.

5. The gaming apparatus of claim 1, wherein said controller is further programmed to allow the user to input data wherein the data comprises alpha and numeric characters.

6. The gaming apparatus of claim 5, wherein said controller is further programmed to gather data comprising data needed to issue a player card.

7. The gaming apparatus of claim 6, wherein said controller is further programmed to communicate the gathered data to a memory.

8. The gaming apparatus of claim 5, wherein said gaming apparatus further comprises a card printer operatively coupled to the controller.

9. The gaming apparatus of claim 8, wherein said controller being further programmed to instruct the card printer to create a player card based on gathered data.

10. The gaming apparatus of claim 9, wherein the card is created in less than one minute.

11. The gaming apparatus of claim 1, wherein the user is allowed to transfer winnings from a winning betting receipt to credits for playing on the gaming apparatus.

12. The gaming apparatus of claim 11, wherein credits from a winning betting receipt can be redeemed to purchase at least one of a group of:

upgrades at a gaming location;
purchase meals at a restaurant;
purchase a future stay at a gaming establishment; and
purchase entertainment tickets.

13. The gaming apparatus of claim 1 wherein the betting receipt is stored and authorized.

14. The gaming apparatus of claim 1 wherein the input device is an optical scanner.

15. The gaming apparatus of claim 1, wherein the additional data includes a view of a status update of the remotely occurring event;

a view of a replay of a portion of the remotely occurring event;
a view of a replay of a portion of commentary on the remotely occurring event; or
presentation of additional betting options related to the event.

16. The gaming apparatus of claim 1, wherein the first game type is a type of game played at a casino, and the remotely occurring event is a sporting event.

17. A gaming method comprising:

displaying on a display unit video images of a game of a first game type;
allowing a user to input information into an input device;
allowing a user to play the game;
allowing the user to access a network and view on the display unit additional data comprising information in addition to information related to the game; and
receiving a betting receipt, in an input device, representing a separate bet previously made on a remotely occurring event that is not a bet on a game of the first game type;
providing the user with data related to the game of the first game type and view additional data related to the remotely occurring event on the display unit.

18. The gaming method of claim 17, further comprising an email interface as the additional data.

19. The gaming method of claim 17, further comprising displaying an Internet browser interface as the additional data.

20. The gaming method of claim 17, further comprising displaying as the additional data at least one of:

gaming location related information;
gaming establishment related information;
transportation related information; and
special event related information.

21. The gaming method of claim 17, further comprising allowing the user to input information comprising alpha and numeric characters.

22. The gaming method of claim 17, further comprising gathering data needed to issue a player card.

23. The gaming method of claim 22, further comprising instructing a card printer in communication with a gaming apparatus to instruct the card printer to create a player card based on the gathered data.

24. The gaming method of claim 22, further comprising creating the player card in less than one minute.

25. The gaming method of claim 17, further comprising allowing the user to use credits from a winning betting receipt to purchase merchandise or services through a gaming apparatus.

26. The gaming method of claim 25 comprising allowing the user to use credits from a winning betting receipt to purchase through the gaming apparatus at least one of:

upgrades at a gaming location;
purchase meals at a restaurant;
purchase a future stay at a gaming establishment; and
purchase entertainment tickets.

27. The gaming method of claim 17, further comprising storing and authorizing the betting receipt.

28. The gaming method of claim 17, further comprising allowing users to input information through the input device wherein the input device is an optical scanner.

29. The method of claim 17, wherein the additional data includes a view of a status update of the remotely occurring event;

a view of a replay of a portion of the remotely occurring event;
a view of a replay of a portion of commentary on the remotely occurring event; or
presentation of additional betting options related to the remotely occurring event.

30. The method of claim 17, wherein the first game type is a type of game played at a casino, and the remotely occurring event is a sporting event.

* * * * *